(12) United States Patent
Bleiweiss et al.

(10) Patent No.: US 9,507,758 B2
(45) Date of Patent: Nov. 29, 2016

(54) COLLABORATIVE MATTER MANAGEMENT AND ANALYSIS

(71) Applicants: Ofer Bleiweiss, Beverly Hills, CA (US); Jeremiah Kelman, Los Angeles, CA (US)

(72) Inventors: Ofer Bleiweiss, Beverly Hills, CA (US); Jeremiah Kelman, Los Angeles, CA (US)

(73) Assignee: ICEBOX INC., Los Angeles, CA (US)

( * ) Notice: Subject to any disclaimer, the term of this patent is extended or adjusted under 35 U.S.C. 154(b) by 438 days.

(21) Appl. No.: 13/935,425

(22) Filed: Jul. 3, 2013

(65) Prior Publication Data

US 2015/0012805 A1 Jan. 8, 2015

(51) Int. Cl.
*G06F 17/22* (2006.01)
*G06F 17/30* (2006.01)
*G06K 9/00* (2006.01)

(52) U.S. Cl.
CPC ..... *G06F 17/2235* (2013.01); *G06F 17/30011* (2013.01); *G06K 9/00469* (2013.01)

(58) Field of Classification Search
CPC .................................................. G06F 17/2235
USPC ....................................................... 715/205
See application file for complete search history.

(56) References Cited

U.S. PATENT DOCUMENTS

| | | | | |
|---|---|---|---|---|
| 5,960,448 A * | 9/1999 | Reichek | ............... | G06F 3/0481 715/236 |
| 6,839,879 B1 * | 1/2005 | Hwang | ............. | G06F 17/30011 707/999.007 |
| 7,043,489 B1 * | 5/2006 | Kelley | .................. | G06Q 10/10 |
| 7,197,716 B2 * | 3/2007 | Newell | ............. | G06F 17/30873 707/E17.111 |
| 7,249,026 B1 * | 7/2007 | Bennett | ............. | G06F 17/30637 705/311 |
| 2003/0041306 A1 * | 2/2003 | Takahashi | ......... | G06F 17/30011 715/209 |
| 2005/0166139 A1 * | 7/2005 | Pittman | ................. | G06Q 10/10 715/229 |
| 2006/0178925 A1 * | 8/2006 | Meece | .................. | G06Q 10/10 705/7.19 |
| 2006/0195430 A1 * | 8/2006 | Arumainayagam | | G06F 17/30011 |
| 2007/0005637 A1 * | 1/2007 | Juliano | .................. | G06Q 50/18 |
| 2007/0016848 A1 * | 1/2007 | Rosenoff | ........... | G06F 17/30014 715/205 |
| 2007/0239704 A1 * | 10/2007 | Burns | ............... | G06F 17/30864 |
| 2007/0271517 A1 * | 11/2007 | Finkelman | ............. | G06Q 50/18 715/742 |
| 2008/0267511 A1 * | 10/2008 | Bourrieres | ............... | G07F 7/125 382/209 |
| 2009/0052804 A1 * | 2/2009 | Lewis | ............... | G06F 17/30253 382/298 |
| 2009/0150168 A1 * | 6/2009 | Schmidt | ................. | G06Q 50/18 705/311 |
| 2009/0177618 A1 * | 7/2009 | Schneider | ......... | G06F 17/30286 |
| 2010/0092088 A1 * | 4/2010 | Roman | ............. | G06K 9/00469 382/182 |
| 2010/0157354 A1 * | 6/2010 | Darwish | ........... | G06F 17/30011 358/1.15 |

(Continued)

OTHER PUBLICATIONS

Boella, Guido, Llio Humphreys, Marco Martin, Piercarlo Rossi, and Leendert van der Torre. "Eunomos, a legal document and knowledge management system to build legal services." In International Workshop on AI Approaches to the Complexity of Legal Systems, pp. 131-146. Springer Berlin Heidelberg, 2011.*

*Primary Examiner* — Frank D Mills
(74) *Attorney, Agent, or Firm* — Cotman IP Law Group, PLC

(57) ABSTRACT

A collaborative matter management and analysis tool is presented. Each matter has its own workspace that is built around a collaborative backbone. Users can provide access to the matter workspace to anyone who they want to collaborate with, including others at their organization and persons outside the organization, such as clients, lawyers, experts, vendors and other third parties. Processing of the document is automatic and based on the content and document type. The document, when uploaded, is OCR'd and based on the content, citations are converted to hyperlinks and the cited documents are linked. All collaborative discussions about the document are captured and stored with the document.

20 Claims, 14 Drawing Sheets

(56) References Cited

U.S. PATENT DOCUMENTS

| | | | | |
|---|---|---|---|---|
| 2010/0235305 A1* | 9/2010 | Evanitsky | ............. | G06Q 10/10 706/12 |
| 2010/0332520 A1* | 12/2010 | Lu | ........................ | G06Q 10/10 707/769 |
| 2011/0040784 A1* | 2/2011 | Rousseau | ............ | G06F 17/2288 707/769 |
| 2011/0246532 A1* | 10/2011 | Wiemann | .......... | G06F 17/30011 707/802 |
| 2012/0072422 A1* | 3/2012 | Rollins | ............... | G06F 17/2745 707/737 |
| 2014/0143545 A1* | 5/2014 | McKeeman | ........ | H04L 63/0853 713/168 |
| 2014/0281870 A1* | 9/2014 | Vogel | ................... | G06F 17/246 715/220 |

\* cited by examiner

FIGURE 5

FIGURE 10B 1  10. ENJOINING Boeing and Lockheed Martin from engaging in further
2 anticompetitive conduct in violation of the California Cartwright Act;
3  11. ENJOINING Boeing and Lockheed Martin from engaging in further
4 unfair business practices in violation of Section 17200 of the California Business &
5 Professions Code;
6  12. AWARDING SpaceX actual and exemplary damages resulting from
7 Boeing and Lockheed Martin's unlawful conspiracy and conduct in furtherance of
8 their conspiracy, including without limitation, treble damages under 15 U.S.C.
9 § 15(a), Section 16750 of the California Cartwright Act, and such other exemplary
10 damages as are available at law, including those available on account of Boeing and
11 Lockheed Martin's oppression, fraud, or malice, and attorneys' fees and costs;
12  13. AWARDING SpaceX all damages available under 18 U.S.C.
13 § 1964(c), including without limitation treble damages, and attorneys' fees and
14 costs; and
15  14. PROVIDING SpaceX such other and further relief as the Court may
16 deem just and proper under the circumstances.

17 Dated: October 19, 2005  CHARLES S. BARQUIST
18         ANTHONY L. PRESS
          STEVEN M. HAINES
19   — 1016     MORRISON & FOERSTER LLP
20
21       By: _____
          Charles S. Barquist
22         Attorneys for Plaintiff
23         SPACE EXPLORATION
          TECHNOLOGIES
24         CORPORATION

COLLABORATIVE MATTER MANAGEMENT AND ANALYSIS

BACKGROUND OF THE INVENTION

Field of the Invention

Embodiments of the invention described herein pertain to the field of matter management. More particularly, but not by way of limitation, one or more embodiments of the invention enable collaborative management and analysis of legal matters.

Description of the Related Art

Litigators perform critical job functions by working with a massive universe of documents consisting of evidence, attorney work product, legal research, and case filings. A small fraction of this universe of documents is relevant or "critical" at any given time to a lawyer's day-to-day case needs. This small fraction of critical documents, however, is also in its own right a large universe of documents. For example, whereas in a typical case there could be a few million documents exchanged by the parties, between a few hundred and a thousand key documents will typically be used in connection with depositions, motions and trials. In addition, lawyers must manage and access a docket or "master file" of court and litigation documents, including pleadings, motion papers, discovery requests and responses, correspondence, deposition transcripts and video, and legal work product, which in total can consist of several thousand individual documents. In order to perform their day-to-day substantive tasks (e.g., research, writing, analysis, depositions, hearings, trial) lawyers need to effectively manage, organize, and have rapid on-demand access to every individual key document.

Current systems for storing and collaborating around key documents are fragmented, overloaded, slow, and ill-equipped for the specific demands and needs of lawyers engaged in high-stakes, fast-paced, document-intensive litigation. With respect to management of evidence, the massive volume of documents requires lawyers to use complex review databases that are specifically designed for the purposes of culling through large sets of documents. These databases are not designed to enable easy, streamlined, and rapid access to individual or more limited sets of key documents.

Currently there are a number of solutions for litigation management and analysis. These solutions fall into four categories: (a) Case Analysis Software, (b) e-Discovery Review Tools, (c) Document Management Systems, and (d) General Enterprise Collaboration Software.

Case Analysis Software. The current slate of case analysis software is limited, difficult to use, ineffective, and not collaborative. The primary solutions are not designed with a litigator's day-to-day workflow in mind.

E-Discovery Review Tools. E-discovery review tools serve a particular purpose in the life of the litigation: These tools are designed to house thousands or millions of documents to facilitate a large-scale review, performed manually by attorneys or automated by a method such as predictive coding. This review can be done for the purposes of determining what documents need to be produced to the other side, to review what the other side produced to determine what is important, or both. Partners, senior attorneys, and clients typically stay away from these solutions, relying on junior associates and support staff to pull documents they need. We view these tools as complementary to our invention, and essential to conduct the massive review necessary to identify the key documents housed within the present invention. The present invention effectively sits on top of these massive databases, and all the key documents identified in the database are easily fed into the present invention.

Document Management Systems ("DMS"). The primary use of DMS by law firms is for version control in document drafting. As with e-discovery review tools, we view this use as complementary to the present invention. Some firms store the master file for the case via their DMS, i.e., the litigation and court documents, like pleadings, discovery, motions, transcripts, orders and the like. Other firms use a combination of DMS and network folders to store the master file. Popular DMS have little to no collaborative elements. They are also not cloud based, meaning increased IT and hardware expenditures. They also offer a very archaic and unintuitive user interface.

General Enterprise Collaboration Software. These solutions are not viable options for the legal industry. They offer no case management or analysis features, or anything specific to litigation. Without extensive custom implementation these solutions will, at best, be extremely limited in their ability to help litigators do what they need to do.

Typical products in the case analysis and e-discovery review space use tables to display items such as documents. Each row in the column represents a different document. Each column represents a different attribute about the item. Users can customize and add numerous columns to the table layout. This often results in a table that extends beyond the right edge of the screen. This creates a number of problems: First, it requires extensive scrolling to find needed information. Second, there is no system organizing the columns based on the type of content they contain or their relationship to other columns. This makes it difficult for the user to know where to look for needed information. Third, when the user scrolls beyond the edge of the screen, the user quickly loses the ability to identify what item is represented by a given row.

In light of the complexity and volume of documents that lawyers deal with, and the limitations of existing software solutions, teams of administrative staff such as legal secretaries, litigation clerks, paralegals, and litigation technology specialists spend a substantial portion (if not the vast majority) of their time managing and organizing documents. With respect to critical case documents, this process often occurs manually, without significant automation by software or technology. With little standardization of organizing case documents and little technical assistance from software, it is common for the process of organizing documents to be carried out directly by more expensive junior attorneys, who chose to avoid the inefficiencies of working with layers of staff. As a result, expensive, highly trained lawyers often spend more of their time performing administrative tasks and dealing with cumbersome systems and processes for managing documents, than on the substantive legal tasks that they are best equipped to perform (e.g., research, analysis, writing). Moreover, clients, co-counsel and experts do not have readily-available access to the same universe of documents and work product as the primary outside litigation counsel. Therefore, communication and collaboration between these groups is often inefficient and not optimally productive.

With the ever-increasing scope and cost of litigation caused by the explosion of e-discovery, corporate in-house counsel are demanding greater efficiency and transparency from their outside litigation counsel. As such, litigators need an efficient system for managing, collaborating around, and sharing critical case documents. Addressing this need would increase cost-efficiency, improve client communication, and lead to better case results by freeing up attorney time for substantive tasks, and by providing better insight into key evidence and the complex relationships between key documents and witnesses.

BRIEF SUMMARY OF THE INVENTION

One or more embodiments of the present invention comprise an efficient platform for managing, sharing, analyzing, and collaborating around the most critical matter documents and information. By way of example, a matter can be civil litigation, criminal prosecution, arbitration, mediation or a transaction. The platform can be accessed via the web and with any device, including tablet and mobile phone, from anywhere so long as there is internet access.

Each matter has its own workspace built around a collaborative backbone. Lawyers can provide access to the matter workspace to anyone who they want to collaborate with, including others at their organization and persons outside the organization, such as clients, lawyers, experts, vendors and other third parties. The workspace offers a suite of tools designed for lawyers to manage every aspect of a matter from start to finish. These include tools to manage, analyze, and relate documents and files, or portions of those documents and files, including evidence, litigation and court documents, attorney work product, legal authorities, and transactional documents. It also includes tools to manage tasks, deadlines and workflow. Additionally, the present invention aggregates information and automatically and intelligently relates documents, key persons, issues, user comments, attorney work product and other metadata in real time.

In one or more embodiments of the present invention, when a document is uploaded into the system, it is automatically OCR'd (Optical Character Recognition) and the results are analyzed and stored in the metadata of the document. For example, the system checks if the document is Bates stamped. If the document has a Bates stamp, the present invention will capture the beginning Bates stamp and calculate the document's Bates range. This information will be stored in the metadata for the document. The document will also be associated with the party that produced the document and production volume containing it.

In one or more embodiments of the present invention, the system automatically checks if a newly loaded item (e.g., a document) is a Version of an existing item. If so, the items are linked as Versions of one another.

One or more embodiments of the present invention will automatically scan each newly loaded document for citations to other documents. Every citation is converted into a hyperlink that links to a cited document that is located in the system. If the cited document is not located in the system, it will create a placeholder entry for the document in the appropriate location (e.g., Evidence). Citations to legal authorities that are not in the system will be pulled automatically from a legal resource database, uploaded to the system, and linked to the document.

Also, all items and metadata are scanned for Players. When an item or its metadata relate to a Player, the item is automatically associated with the Player and added to the Player's File. When a new Player is added, the Player is checked against all items and metadata for items that should be affiliated with the Player. The system also tracks how Players relate to one another and to issue tags.

The invention also offers organizational features. These include features to leverage an organization's expertise, manage shared contacts, and aggregate, access and analyze organization documents, including work product and resources.

The platform is intended to provide users with instant access to everything they would want to know about their matters, updated in real time to reflect contributions by the team, and enable them to collaborate with others within and outside the organization.

BRIEF DESCRIPTION OF THE DRAWINGS

The above and other aspects, features and advantages of the invention will be more apparent from the following more particular description thereof, presented in conjunction with the following drawings wherein:

FIG. 5 is an illustration of the timing tab in accordance with one or more embodiments of the present invention.

FIGS. 10A-D are illustrations of parsing a typical Master File document in accordance with one or more embodiments of the present invention.

FIG. 11 is an illustration of parsing a typical evidence production page in accordance with one or more embodiments of the present invention.

DETAILED DESCRIPTION

A system and method for collaborative matter management and analysis will now be described. In the following exemplary description, numerous specific details are set forth in order to provide a more thorough understanding of the embodiments of the invention. It will be apparent, however, to an artisan of ordinary skill that the present invention may be practiced without incorporating all aspects of the specific details described herein. Furthermore, although steps or processes are set forth in an exemplary order to provide an understanding of one or more systems and methods, the exemplary order is not meant to be limiting. One of ordinary skill in the art would recognize that the steps or processes may be performed in a different order, and that one or more steps or processes may be performed simultaneously or in multiple process flows without departing from the spirit or the scope of the invention. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

For a better understanding of the disclosed embodiment, its operating advantages, and the specified object attained by its uses, reference should be made to the accompanying drawings and descriptive matter in which there are illustrated exemplary disclosed embodiments. The disclosed embodiments are not intended to be limited to the specific forms set forth herein. It is understood that various omissions and substitutions of equivalents are contemplated as circumstances may suggest or render expedient, but these are intended to cover the application or implementation.

The terms "first," "second" and the like, herein do not denote any order, quantity or importance, but rather are used to distinguish one element from another, and the terms "a" and "an" herein do not denote a limitation of quantity, but rather denote the presence of at least one of the referenced item.

Figure 1:
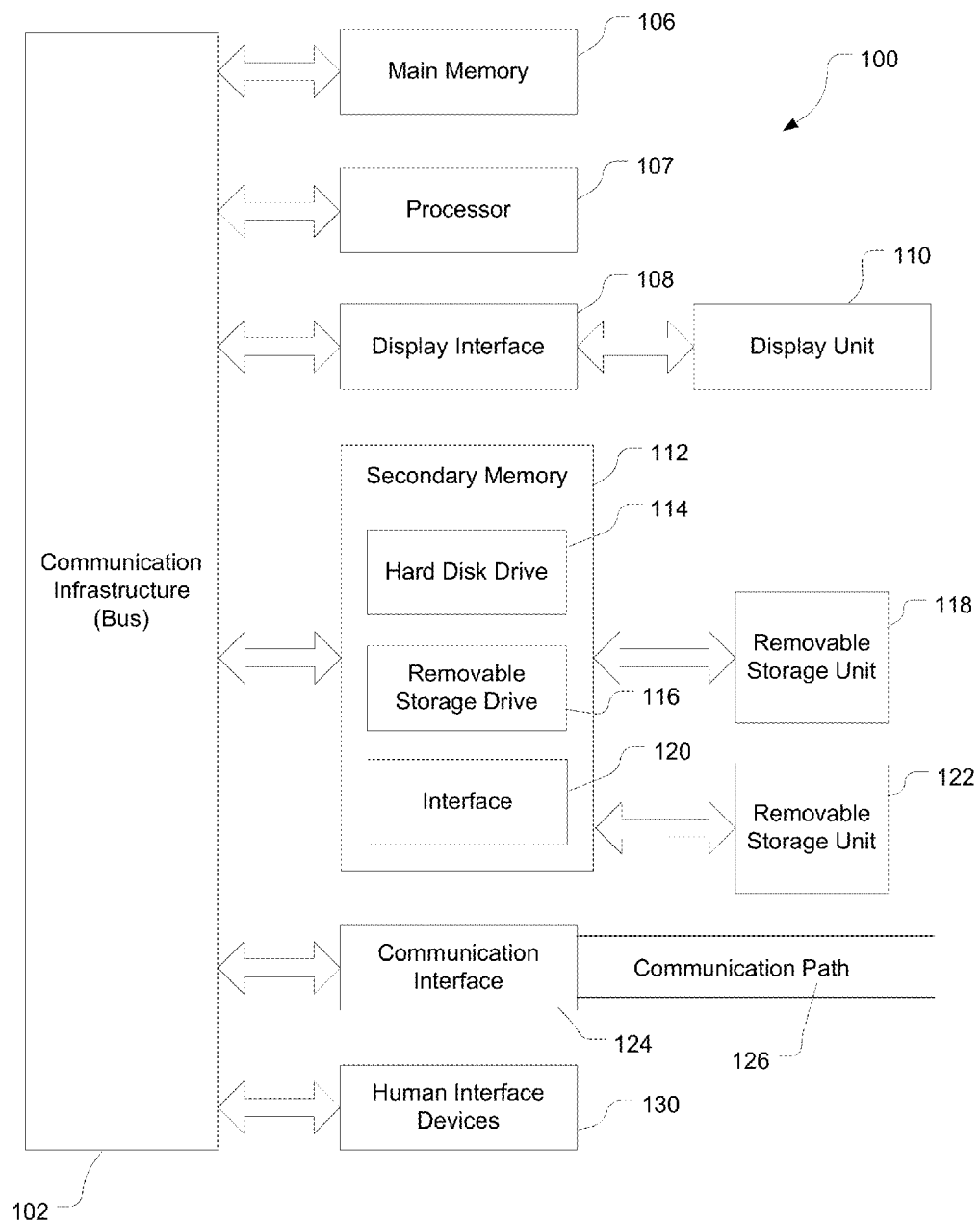
FIG. 1 illustrates a general purpose computer and peripherals that when programmed as described herein may operate as a specially-programmed computer capable of implementing one or more methods, apparatus and/or systems of the solution.

FIG. 1 diagrams a general purpose computer and peripherals, when programmed as described herein, may operate as a specially-programmed computer capable of implementing one or more methods, apparatus and/or systems of the solution described in this disclosure. Processor 107 may be coupled to bi-directional communication infrastructure 102 such as communication infrastructure system bus 102. Communication infrastructure 102 may generally be a system bus that provides an interface to the other components in the general purpose computer system such as processor 107, main memory 106, display interface 108, secondary memory 112 and/or communication interface 124.

Main memory 106 may provide a computer-readable medium for accessing stored data and executing applications. Display interface 108 may communicate with display unit 110 that may be utilized to display outputs to the user of the specially-programmed computer system. Display unit 110 may comprise one or more monitors that may visually depict aspects of the computer program to the user. Main memory 106 and display interface 108 may be coupled to communication infrastructure 102, which may serve as the interface point to secondary memory 112 and communication interface 124. Secondary memory 112 may provide additional memory resources beyond main memory 106, and may generally function as a storage location for computer programs to be executed by processor 107. Either fixed or removable computer-readable media may serve as secondary memory 112. Secondary memory 112 may comprise, for example, hard disk 114 and removable storage drive 116 that may have an associated removable storage unit 118. There may be multiple sources of secondary memory 112 and systems implementing the solutions described in this disclosure may be configured as needed to support the data storage requirements of the user and the methods described herein. Secondary memory 112 may also comprise interface 120 that serves as an interface point to additional storage such as removable storage unit 122. Numerous types of data storage devices may serve as repositories for data utilized by the specially-programmed computer system. For example, magnetic, optical or magnetic-optical storage systems, or any other available mass storage technology that provides a repository for digital information may be used.

Communication interface 124 may be coupled to communication infrastructure 102 and may serve as a conduit for data destined for or received from communication path 126. A network interface card (NIC) is an example of the type of device that once coupled to communication infrastructure 102 may provide a mechanism for transporting data to communication path 126. Computer networks such Local Area Networks (LAN), Wide Area Networks (WAN), wireless networks, optical networks, distributed networks, the Internet, the Cloud, or any combination thereof are some examples of the type of communication paths that may be utilized by the specially-programmed computer system. Communication path 126 may comprise any type of telecommunication network or interconnection fabric that can transport data to and from communication interface 124.

To facilitate user interaction with the specially-programmed computer system, one or more human interface devices (HID) 130 may be provided. Some examples of HIDs that enable users to input commands or data to the specially-programmed computer system may comprise a keyboard, mouse, touch screen devices, microphones or other audio interface devices, motion sensors or the like, as well as any other device able to accept any kind of human input and in turn communicate that input to processor 107 to trigger one or more responses from the specially-programmed computer system are within the scope of the system disclosed herein.

While FIG. 1 depicts a physical device, the scope of the system may also encompass a virtual device, virtual machine or simulator embodied in one or more computer programs executing on a computer or computer system and acting or providing a computer system environment compatible with the methods and processes of this disclosure. In one or more embodiments, the system may also encompass a cloud computing system or any other system where shared resources, such as hardware, applications, data, or any other resource are made available on demand over the Internet or any other network. In one or more embodiments, the system may also encompass parallel systems, multi-processor systems, multi-core processors, and/or any combination thereof. Where a virtual machine, process, device or otherwise performs substantially similarly to that of a physical computer system, such a virtual platform will also fall within the scope of disclosure provided herein, notwithstanding the description herein of a physical system such as that in FIG. 1.

One or more embodiments of the present invention comprise a system and method for managing, sharing, analyzing, and collaborating around the most critical matter documents and information. The system of the present invention comprises one or more client computers 100, one or more network servers, and one or more software platforms (e.g., modules) executing the methods of the present invention thereon. Client computer 100 could be a desktop computer, a laptop, a tablet, a smart phone, etc. that provides the user an interface to the software platform.

Embodiments of the present invention provide software systems and components that execute on computer systems and similar systems for analysis and collaboration about a document by tracking all comments and communications about the document thereby creating work product. The comments and/or communications may be through social media, email, reviewing of the document itself, etc. irrespective of the media or original input source of the comment, it tracks to the document. The present invention ties user comments to the items they are made about. For example, when a user accesses a document, she can access every conversation and comment made about that document.

In one or more embodiments of the present invention, each document comprises the file itself (e.g., a Master File document), and one or more metadata fields. In a preferred embodiment, the metadata fields include: OCR'd text field; Evidence Tray; Master File Tray; Legal Authority Tray, etc. Additional metadata may be added for other functions, for instance, for associating a document with Players, party, date, document type, etc.

Master File

The Master File is an important element in processes of the present invention. The Master File stores the documents created during the course and for the purpose of a matter (e.g., litigation). This includes pleadings, motions, deposition transcripts and videos, hearing transcripts, orders, discovery requests and responses, and more. For instance, the documents may be organized in a hierarchical structure based on a lead document, for example in a motion sequence (e.g., Opening Brief, Opposition, Reply, Hearing Transcript, Order, etc.). The hierarchical arrangement is automatically provided based on the document type of the lead document or can be manually assigned by the user.

The Master File has an interface that enables users to relate multiple items and define the relations between the items. These relations include Versions, Attachments, Families, Clusters, etc. Any document can have Attachments. Relating multiple documents creates a Family. Relating Families creates a Cluster (e.g., motion, opposition, reply, hearing and order). Clusters can also be related (e.g., relating a motion Cluster with the meet and confer correspondence Cluster related to the motion). The Master File has multiple views where the items are automatically organized and ordered based on these relations. Note that the terminologies used herein are not intended to be limiting in any way so long as the appropriate function is achieved.

Figure 2:
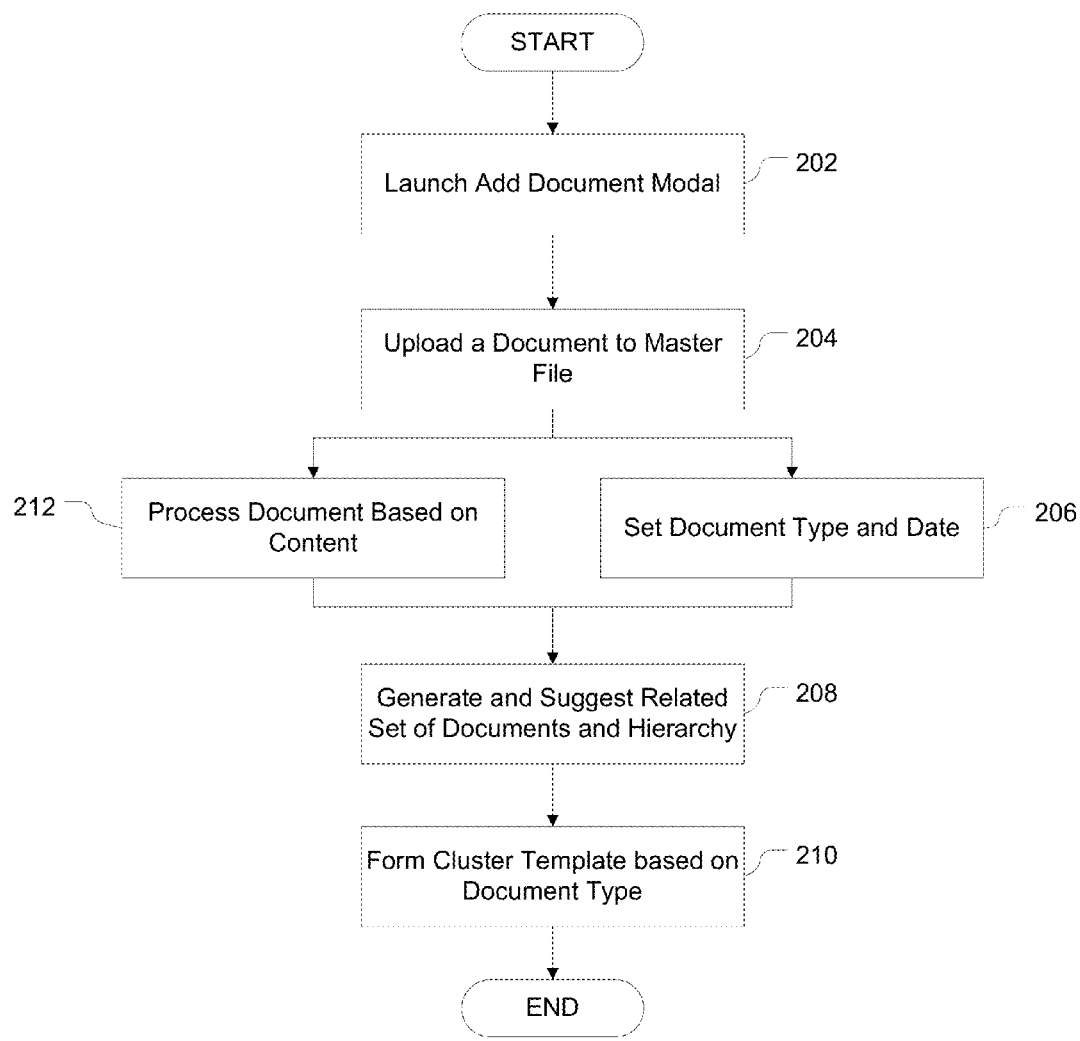
FIG. 2 is an illustration of the process of creating the Master File in accordance with one or more embodiments of the present invention.
Figure 3:
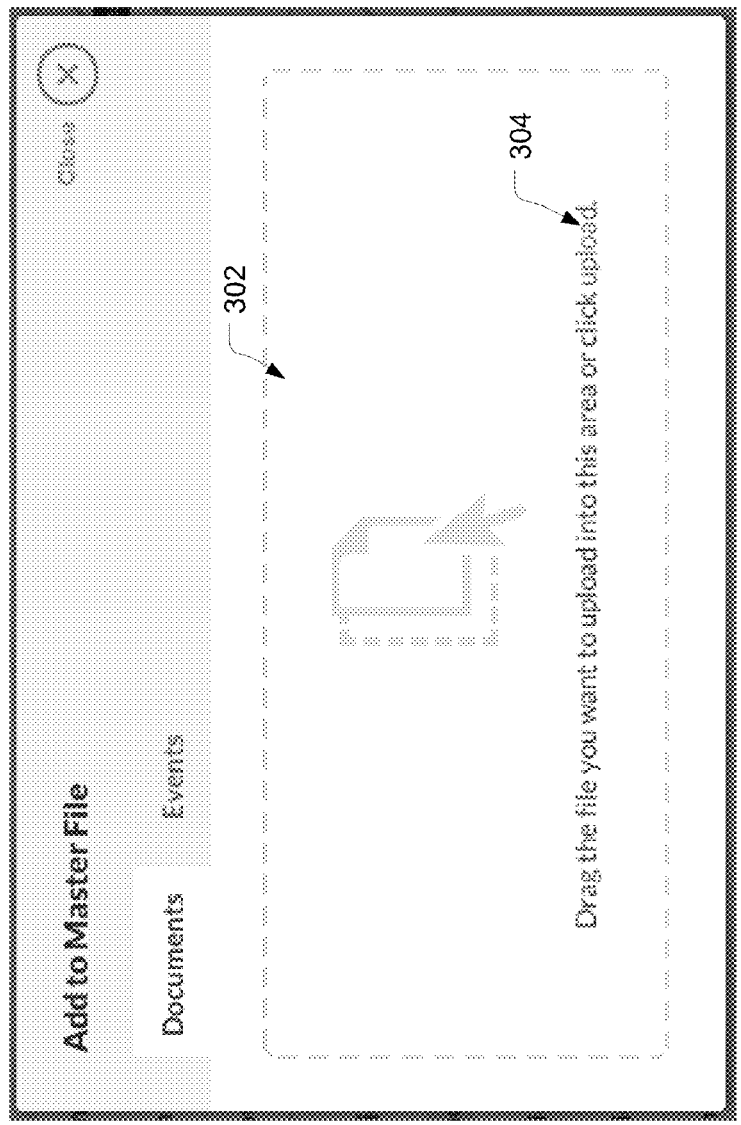
FIG. 3 is an illustration of the add document modal in accordance with one or more embodiments of the present invention.

FIG. 2 is an illustration of the process of creating the Master File in accordance with one or more embodiments of the present invention. To load a document to the Master File, the user launches an add document modal in step 202 and a dialogue box similar to that illustrated in FIG. 3, block 302, pops up. The add document modal lets the user upload a document to the Master File in step 204 using one of several file upload methods (e.g., by dragging the document into the modal 302, using the browser to select the file by clicking "upload" 304, or by bulk uploading multiple documents, etc.).

Figure 4:
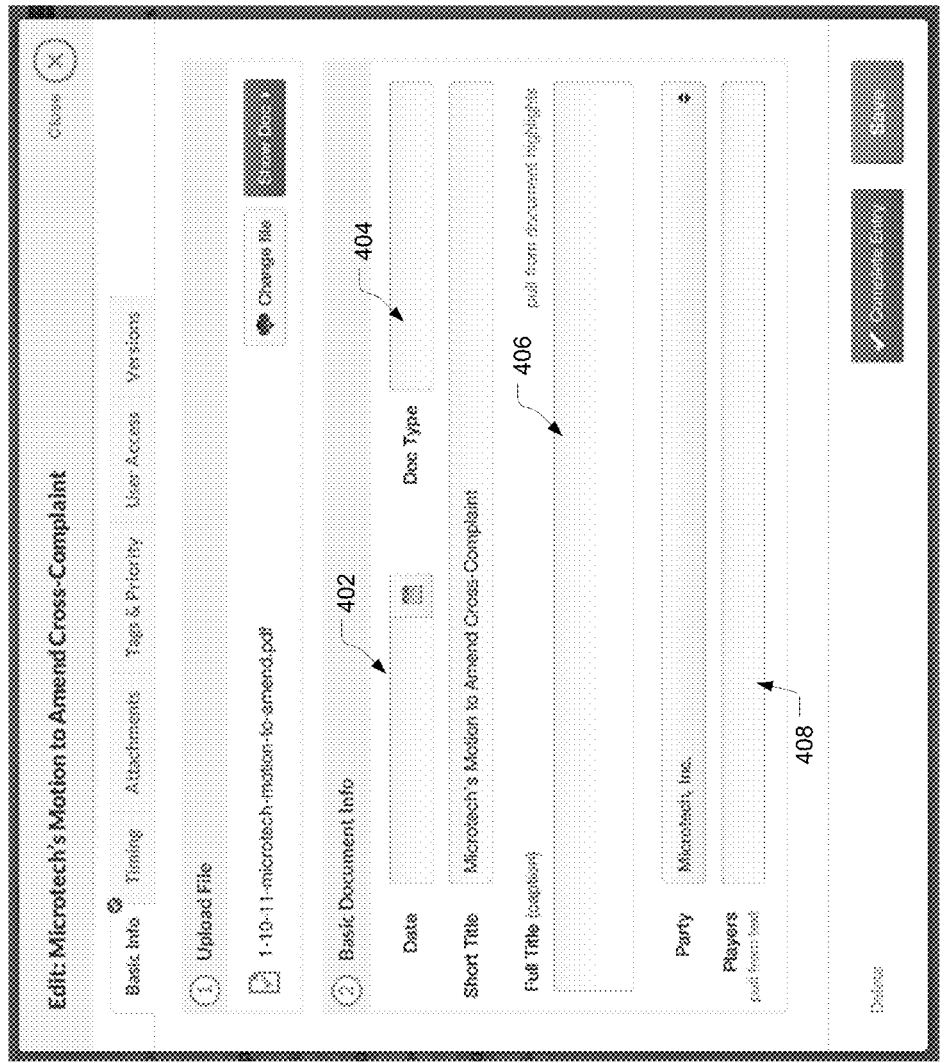
FIG. 4 is an illustration of the basic information tab in accordance with one or more embodiments of the present invention.

Once the document is added, a modal appears wherein the user may enter the document type and date in step 206. Simultaneously however, automatic processing of the document commences in step 212, which may result in auto-populating the document's metadata fields (e.g., type, date, Players, etc.). Setting or changing of the document type and date may be facilitated with a dialogue box, e.g., example shown in FIG. 4, which appears with fields for the user to enter the date of document (i.e., document loaded in step 204) in the Date field 402, to set the document type in the Document Type field 404, and to enter the full title of the document in the Full Title field 406. The user may also enter or change the Players (discussed below) in field 408. Based on the document type, the system will suggest the basic set of related documents and hierarchy and present the suggested set in the Timing tab, illustrated in FIG. 5. The user can also add fields beyond those suggested by the system. For example: if the document type is a motion, the document is assigned to a motion cluster template along with entries for opposition, reply, hearing, and order (the user can add a field for a sur-reply, for example); if the document type is a discovery request, the document is assigned to a discovery cluster template along with an entry for discovery requests and responses (the user can add fields for amended or supplemental responses, for example); etc.

In step 212, the document is OCR'd, and automatic processing is performed based on the contents of the document. Automatic processing includes the auto-population process described in detail below.

Once the date and document type are set for the Master File document, the system automatically generates a set of placeholders for related documents and hierarchy for the Master File document in step 208. The hierarchy and related documents are presented in the Timing Tab.

Figure 5:
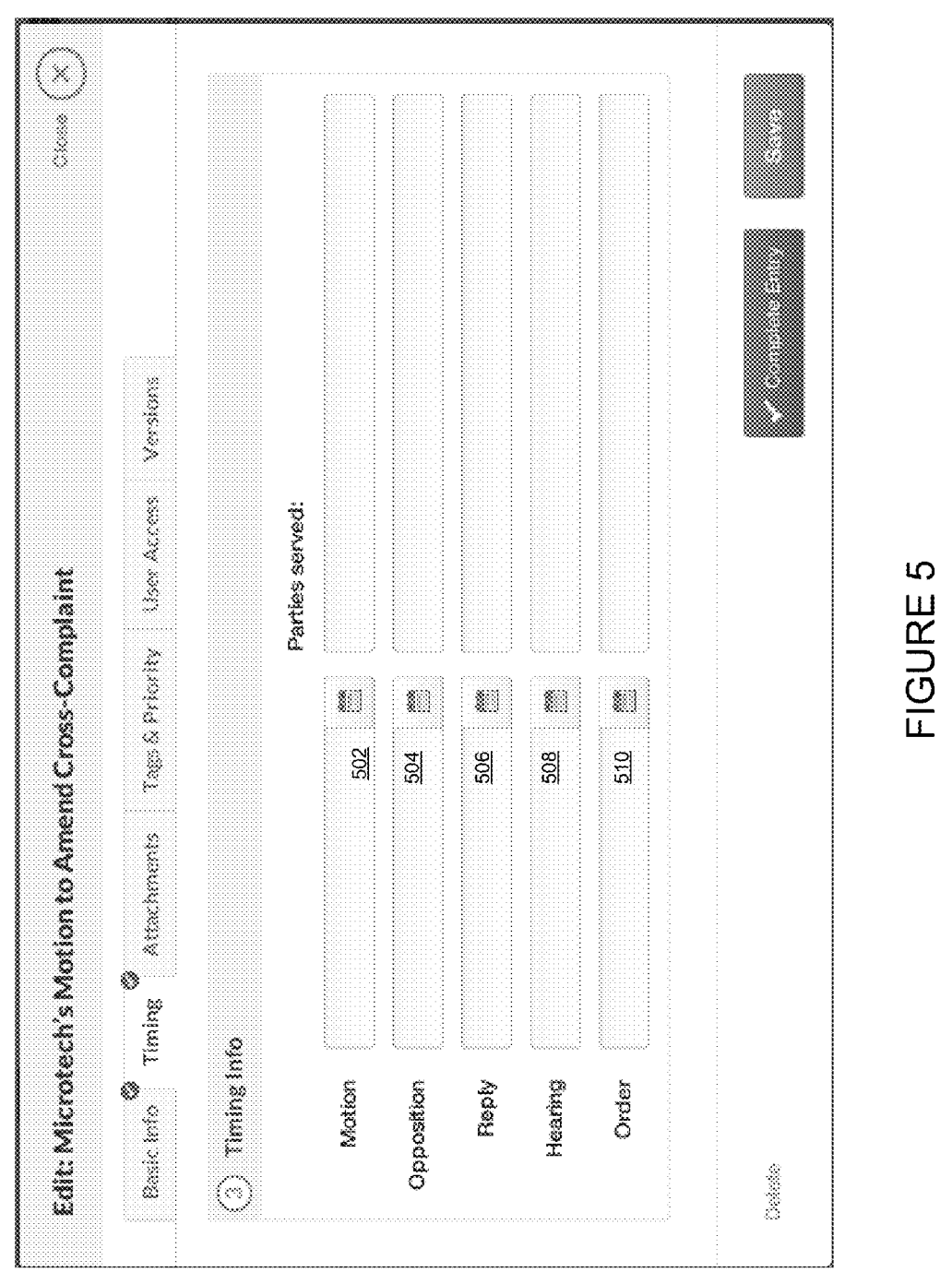

FIG. 5 is an illustration of the Timing tab in accordance with one or more embodiments of the present invention. In the Timing tab, the user can adjust the hierarchy and fields (e.g., remove, reorder, add custom fields, and so on). Once the hierarchy and the fields are set, the date fields 502 through 510 may be populated automatically (e.g., based on the procedural rules of the jurisdiction) and/or entered manually for each document in the Cluster. Also, the user may re-enter or change the date in each field. Date field 502 is for the Master File document, and thus may inherit the date from step 206. However, this date can also be changed along with any other data in date fields 504 through 510.

For every entry that receives a date in the Timing tab, a corresponding entry is created in the Calendar, which is related to the Calendar entry for the document being added.

Also, when a user adds the document, a cluster template is formed in step 210 based on the document type. The document being added has an entry in the Cluster. Other documents may be added to the entry to create a Family. Every other field in the Timing tab has a placeholder entry so that when the document is ready, users can click on the placeholder entry to upload the document corresponding to it or drag the document to the placeholder entry. If the corresponding document has already been added to the Master File, the system will add it to the placeholder entry or the user can drag it into the Cluster and it will automatically fill in the placeholder entry.

The system provides the user with the ability to edit the Master File's metadata. For instance, the user may edit a document's metadata, isolate incomplete or orphaned entries (entries that are not grouped in Families or Clusters), and organize the Master File (e.g., by assigning relations). In Edit Mode, the present invention splits up the screen where one half shows a filtered view with the entries that either need additional information or have not been related, or both, and the other half of the screen has the complete Master File. Using the split-screen, a user can then scroll through the Master File, get to the appropriate Family or Cluster in the Master File, and then drag the entry from the filtered side into the Master File.

Master File documents are the ones that shape the matter and are typically tied to important dates. These documents are typically related to other documents that came before, or they will command responsive documents in the future. As a result, in one or more embodiments, every document family in the Master File is tied to one or more Calendar entries. Placeholder entries are added as upcoming deadlines, and differentiated by whether they are for the party represented by the user or for the opposing party. Other documents may also be added that are not responsive documents but relate to the document entries in the Cluster.

For example, with a motion Cluster, a user can add entries for meet and confer correspondence.

Family

A Family is a collection of documents that have some form of relationship. A user may create a Family by, for example, dragging one document to another, by selecting multiple documents and designating them as a Family, or similar method. The user can also bulk upload documents together as a Family. The user may arrange the documents in the Family in any manner desired. Usually, the Family Name and Family Type is based on the lead or top document in the Family. If a user reorganizes the Family in a way that changes this top document, the Family Name and Family Type changes based on the new top document. Every document has one or more metadata fields related to the document's Family, which indicate whether a document is in a Family and, if so, what Family. When a document is added to a Family, the field is populated with the Family info. When a document is removed from a Family, the field reflects that the document is not part of a Family.

Families play a very important role in organizing documents. For instance, assume a user filed a motion to dismiss. The motion was filed along with supporting documentation, which could include a declaration, with several exhibits, a proposed order, and a proof of service. The user would upload the motion to dismiss, the declaration, the exhibits, the proposed order, and the proof of service and add them to the Master File. The user can upload these as a Family or upload each document individually and combine them into one Family. The user would then organize the Family to make sure the motion to dismiss is the lead document and drag the exhibits onto the declaration to make them Attachments to the declaration. In one or more embodiments, the Family may be organized automatically by the metadata of the documents in the Family or by the user identifying the parent document, for instance. The Family Name and Family Type will be based on the motion to dismiss since it is the lead document. And as subsequent filings are filed—e.g., the Opposition, the Reply—the user will create similar Families for them.

A Cluster is a collection of Families. Clusters may be created using similar processes as those used to create Families. Families are usually arranged in a Cluster based on the Family Date and Family Type. The Cluster gets its name and type from the lead Family. The system will automatically relate responsive Families as Clusters. For example, if the system identifies that an opposition Family is responsive to a motion Family (e.g., using metadata, results of OCR), it will automatically join the Families in a Cluster. This process may be referred to as auto-relation and may occur during auto-population.

Automatic Document Linking

One or more embodiments of the present invention will automatically link citations in a document to the cited documents. In an exemplary embodiment, when a document is uploaded to the Master File, the system of the present invention will scan the document for citations or references to other documents, such as legal sources (e.g., cases, statutes, ordinances). For each citation in the document, the system will retrieve the corresponding authority from a legal research database and store it in a Research Library, for example. The system then converts the citations in the document to links to the authorities in the Research Library and when a specific excerpt or portion of a document is cited, the citations may be linked to that portion or excerpt of the document. For instance, if the document cites to a paragraph in the complaint or a declaration, or a specific discovery response, the cite will be linked to the document as well as the excerpt.

Also embodiments of the present invention use pin cites because they link to a specific page in an opinion to link to the specific page and text. For instance, if the citation includes a quote, it will highlight the quote in the cited document and if it is not a direct quote, embodiments of the invention may also try to match the language using fuzzy string matching to the approximate part of the opinion that is being cited.

Figure 6:
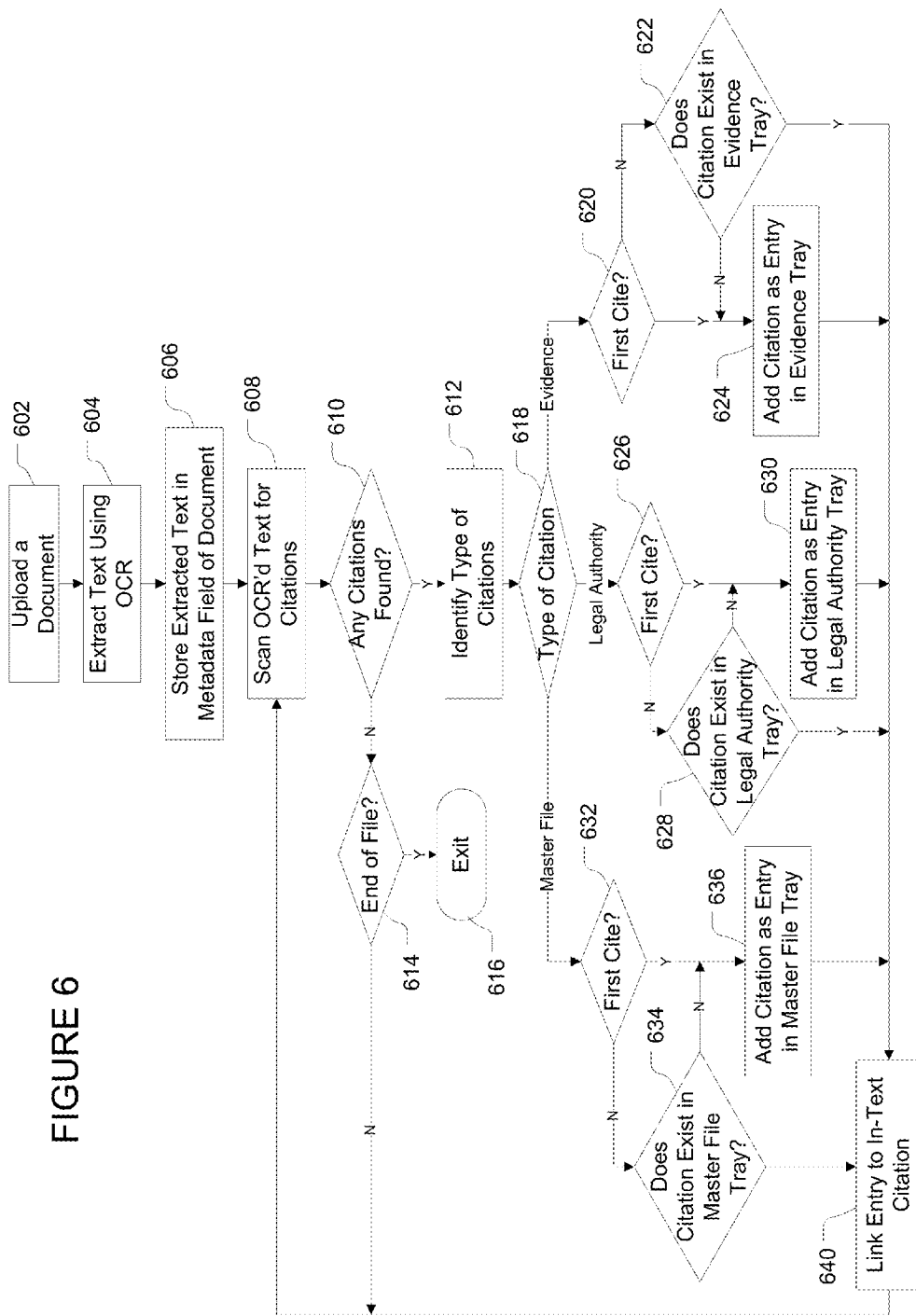
FIG. 6 is an illustration of the process of identification of citations in a document in accordance with one or more embodiments of the present invention.

Automatic Document Linking in embodiments of the present invention is illustrated in FIGS. 6 to 9. FIG. 6 is an illustration of the process of identification of citations in a document in accordance with one or more embodiments of the present invention. In general, each document in one or more embodiments of the present invention includes a template for documents which comprises the document and metadata fields. The metadata fields include, among other things, the OCR'd text and trays for citations to other documents, e.g., Evidence, Master File documents, and Legal Authorities. As illustrated in FIG. 6, a user uploads a document in step 602. The document may be uploaded by dragging the document into the add document modal, using the web browser to select a file, or any other convenient method. After the document is uploaded, the system performs text extraction using OCR on the document in step 604 and stores the extracted text in the metadata field in block 606. Using the results of the OCR process, the system processes the OCR'd text to identify all citations to other documents and to populate the appropriate trays (e.g., citations to evidence are added to the Evidence tray) for automatic document linking.

The automatic document linking continues in step 608 where the system scans the OCR results of the document for citations. In step 610, the system checks if it found any citations and if it did, it identifies the type of citation in step 612. Identification may follow a process such that if it finds Bates numbers, for example, it may assume the citation is evidentiary; if it finds notations that denote citation to a court or litigation document, it may assume it is to a Master File document (e.g., "Ex.," "Tr.," "Decl."); and if it finds legal type citations, the system may assume they are citations to legal authorities; etc. Processing subsequently proceeds to block 618 to identify and populate the appropriate trays.

In block 618, if the type of citation is determined to be evidentiary, e.g., by finding Bates numbers, processing proceeds to block 620 to check if it is the first citation to an evidentiary document. If yes, the citation is added as a new entry in the evidence tray in block 624 and processing proceeds to block 640 where the entry is linked to the in-text citation. However, if in block 620 it is determined that the citation is not the first evidence citation, processing proceeds to block 622 to check if the citation already exists in the Evidence Tray. If no, the citation is added as a new entry in the Evidence Tray in block 624 and processing proceeds to block 640 where the entry is linked to the in-text citation. However, if in block 622 the citation already exists in the Evidence Tray, processing proceeds to block 640 where the entry is linked to the in-text citation. Thus, all subsequent evidentiary citations (i.e., after the first citation) are checked against the existing entries in the Evidence tray and if there is already an entry for the citation, the existing entry is linked to the in-text citation. However, if there is no entry, a new entry is created in the Evidence tray, which is linked to the in-text citation.

If in block 618, the type of citation is determined to be to a Legal Authority, processing proceeds to block 626 to check if it is the first Legal Authority citation. If yes, the citation is added as a new entry in the Legal Authority tray in block 630 and processing proceeds to block 640 where the entry is linked to the in-text citation. However, if in block 626 it is determined that the citation is not the first Legal Authority citation, processing proceeds to block 628 to check if the citation already exists in the Legal Authority Tray. If no, the citation is added as a new entry in the Legal Authority Tray in block 630 and processing proceeds to block 640 where the entry is linked to the in-text citation. However, if in block 628 the citation already exists in the Legal Authority Tray, processing proceeds to block 640 where the entry is linked to the in-text citation. Thus, all subsequent Legal Authority citations (i.e., after the first citation) are checked against the existing entries in the Legal Authority tray and if there is already an entry for the citation, the existing entry is linked to the in-text citation. However, if there is no entry, a new entry is created in the Legal Authority tray, which is linked to the in-text citation.

In one or more embodiments, the system uses the attributes of the Master File document to enhance the process. For instance, since certain Master File documents will have a table of authorities. The system may use the information in the table of authorities to quickly populate the Legal Authority Tray and then subsequently scan the document for the citations in the Tray and/or use the page cites in the table of authorities to help identify the citations.

If in block 618, the type of citation is determined to be to a Master File document, processing proceeds to block 632 to check if it is the first Master File citation. To check for Master File documents, the system scans the OCR results for citations to Master File documents. For instance, if the system finds notations such as "Ex.," "Tr." and "Decl.", it may assume it is a citation to a Master File document. If yes, the citation is added as a new entry in the Master File tray in block 636 and processing proceeds to block 640 where the entry is linked to the in-text citation. However, if in block 632 it is determined that the citation is not the first Master File citation, processing proceeds to block 634 to check if the citation already exists in the Master File Tray. If no, the citation is added as a new entry in the Master File Tray in block 636 and processing proceeds to block 640 where the entry is linked to the in-text citation. However, if in block 634 the citation already exists in the Master File Tray, processing proceeds to block 640 where the entry is linked to the in-text citation. Thus, all subsequent Master File citations (i.e., after the first citation) are checked against the existing entries in the Master File tray and if there is already an entry for the citation, the existing entry is linked to the in-text citation. However, if there is no entry, a new entry is created in the Master File tray, which is linked to the in-text citation.

From block 640 processing proceeds back to block 608 to continue the search for citations in the document until all the citations are processed and placed in the appropriate tray.

However, if in step 610 no citations were found and processing has not reached the end of the document (step 614), then processing returns back to block 608 to continue scanning through the document until the end of document is reached. Processing stops at block 616 when the end of file is reached.

Figure 7:
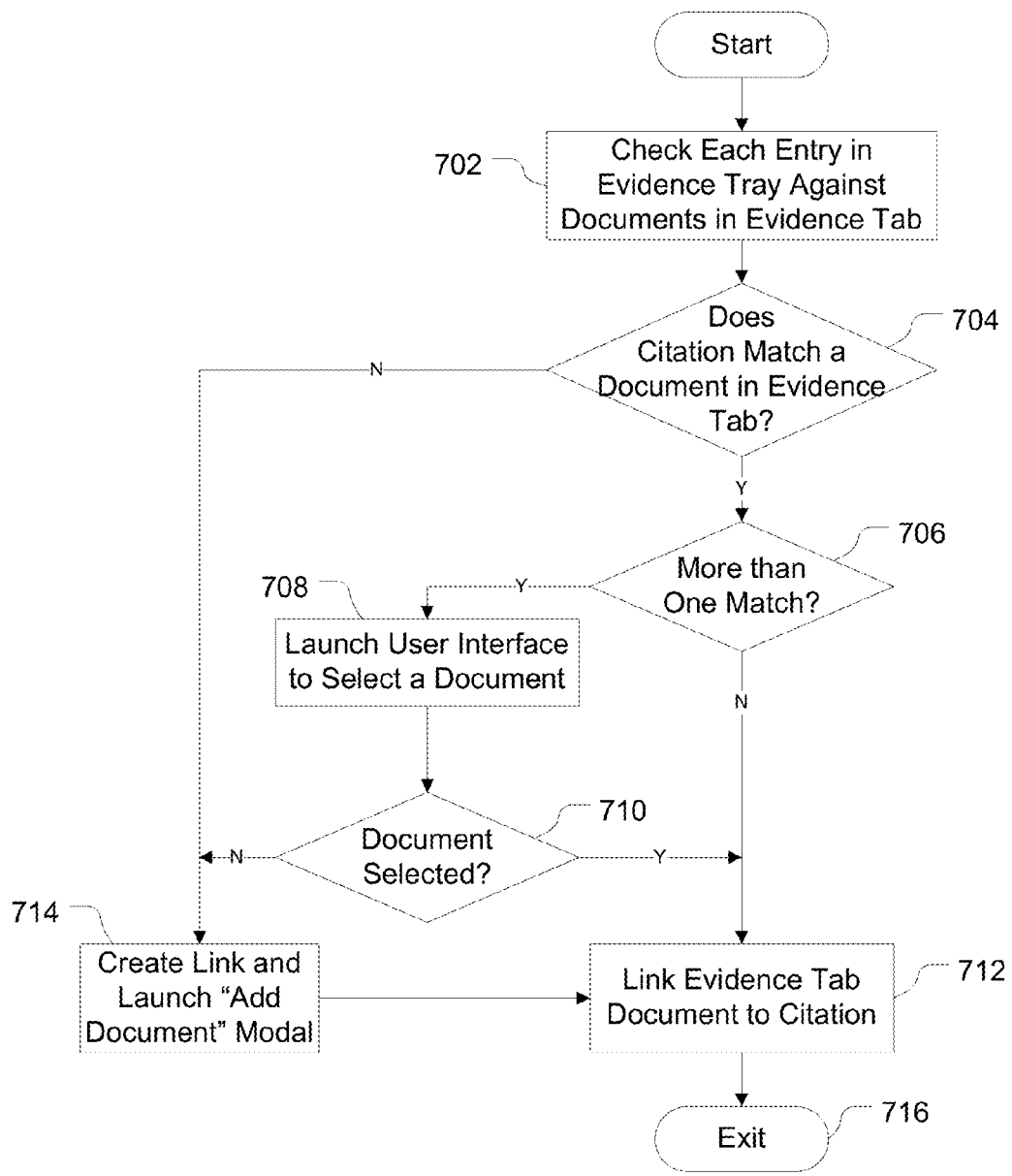
FIG. 7 is an illustration of automatic document linking to evidence citations in accordance with one or more embodiments of the present invention.

FIG. 7 is an illustration of automatic document linking to evidence citations in accordance with one or more embodiments of the present invention. As illustrated, in step 702, each entry in the evidence tray is checked against the documents in the Evidence tab. In step 704, if the citation in the Evidence tray matches a document in the Evidence tab, processing proceeds to step 706 to check if there is more than one potential match. If there is only one match, processing proceeds to step 712 where the document in the Evidence tab is linked to the citation in the Evidence Tray. Processing stops at step 716 once all the entries in the Evidence Tray have been linked to documents in the Evidence tab.

However, if in step 706, the citation in the tray indicates several potential matches, processing continues to step 708 where a user interface is launched indicating all the potential matches and the user is prompted to select from the potential matches. If there is a match, the user selects the proper document by, for instance, selecting the higher level document as the match. Once the higher level document is selected, the user can decide whether to use this for all future references to that document or if the system should check at each potential conflict. If the user selected a document as the match in step 710, processing proceeds to step 712 where the selected document is linked to the citation in the Evidence Tray. Processing stops at step 716 once all the entries in the Evidence Tray have been linked to documents in the Evidence tab.

However, if there is no match between an entry in the Evidence tray and documents in the Evidence tab in step 704, or if within the potential matches indicated by the system in step 708, the user indicates there is no match in step 710 (e.g., by not selecting any one of the documents suggested), the citation is converted to a link that will prompt the system to launch a modal (e.g., "Add Document" modal) allowing the user to manually upload the corresponding document to the Evidence tab in step 714. The manually uploaded document is added to the Evidence tab and linked to the citation in step 712. The system will also create a placeholder for the document in the Evidence tab, and the document can be added from the placeholder. The document can also be added directly from the evidence tray. Processing stops at step 716 once all the entries in the Evidence Tray have been linked to documents in the Evidence tab.

Figure 8:
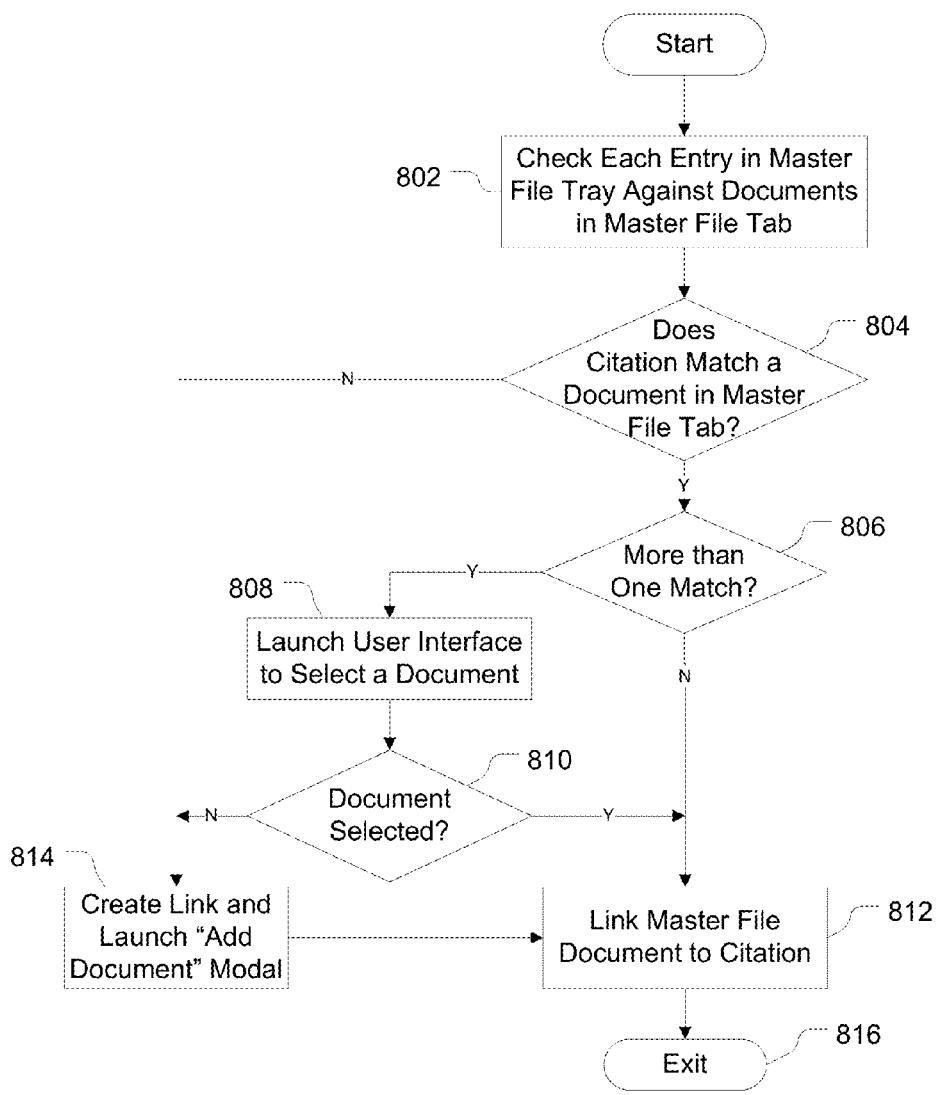
FIG. 8 is an illustration of automatic document linking to Master File citations in accordance with one or more embodiments of the present invention.

FIG. 8 is an illustration of automatic document linking to Master File citations in accordance with one or more embodiments of the present invention. As illustrated, in step 802, each entry in the Master File tray is checked against the documents in the Master File tab. In step 804, if the citation in the Master File tray matches the citation for a document in the Master File tab, processing proceeds to step 806 where a check is made if there is more than one potential match. If there is only one match, processing proceeds to step 812 where the document in the Master File tab is linked to the citation in the Master File Tray. Processing stops at step 816 once all the entries in the Master File Tray have been linked to documents in the Master File tab.

However, if in step 806, the citation in the tray indicates several potential matches, processing continues to step 808 where a user interface is launched indicating all the potential matches and the user is prompted to select from the potential matches. If there is a match, the user selects the proper document by, for instance, selecting the higher level document as the match. For example, suppose the document refers to Exhibit 5 of the Smith Declaration but the system finds four Smith Declarations with five or more exhibits (i.e., the system excludes any declarations with fewer than five exhibits). The user is prompted to select the appropriate Smith Declaration out of the four. The user can then indicate if all references in the document to the Smith Declaration should be linked to this same document, or if the system should prompt the user to identify the document for each subsequent reference to a Smith Declaration. Once the higher level document is selected, the user can decide whether to use this for all future references to that document or if the system should check at each potential conflict. If the user selected a document as the match in step 810, processing proceeds to step 812 where the selected document is linked to the citation in the Master File Tray. Processing stops at step 816 once all the entries in the Master File Tray have been linked to documents in the Master File tab.

However, if there is no match between an entry in the Master File tray and documents in the Master File tab in step 804, or if within the potential matches indicated by the system in step 808, the user indicates there is no match in step 810 (e.g., by not selecting any one of the documents suggested), the citation is converted to a link that will prompt the system to launch a modal (e.g., "Add Document" modal) allowing the user to manually upload the corresponding document to the Master File tab in step 814. The manually uploaded document is added to the Master File tab (e.g., to the Family and/or Cluster of the original document) and linked to the entry in the Master File Tray in step 812. The system may also create a placeholder for the document in the Master File tab, and the document can be added from the placeholder. The document can also be added directly from the Master File tray. Processing stops at step 816 once all the entries in the Master File Tray have been linked to documents in the Master File tab.

Figure 9:
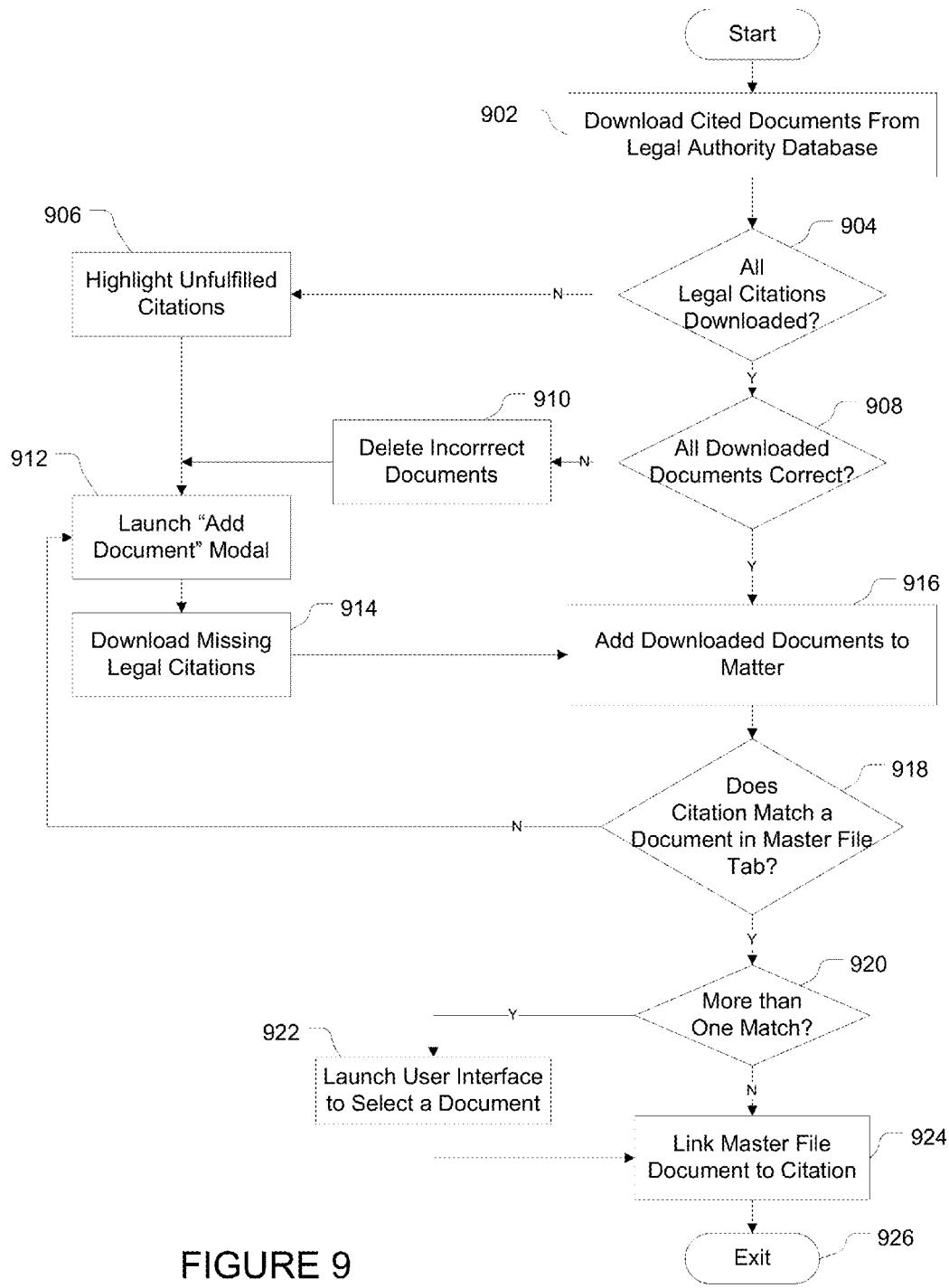
FIG. 9 is an illustration of automatic document linking to legal authority citations in accordance with one or more embodiments of the present invention.

FIG. 9 is an illustration of automatic document linking to legal authority citations in accordance with one or more embodiments of the present invention. The Legal Authority tray is preferably organized alphabetically by authority type (e.g., cases, statutes, etc). In one or more embodiments, the system is able to distinguish original citations from subsequent citations of the same legal authority to minimize repeated downloading of the same legal authority. As illustrated, in step 902, when the tray is complete, the system pings a database of legal authorities and requests the documents corresponding to the citations in the tray. The system downloads these documents to a temporary storage (for example), to the extent available, from the database.

In step 904, a determination is made if all the legal citations have been downloaded. If yes, processing proceeds to step 908 where the downloaded documents are checked for correctness. And if all the downloaded documents are correct, they are added to the Matter (for example, to the Master File or Research Library) in step 916.

However, if in block 908, any of the downloaded documents is determined to be incorrect, processing proceeds to block 910 where the incorrect documents are deleted from temporary storage and a modal (e.g., "Add Document") is launched in block 912 so that the user can manually upload the correct document in block 914. Processing proceeds to block 916 where the downloaded documents are added to the Matter.

After the initial pull of the cited legal authorities 902, the user can manage the citations in the document for citations that were not retrieved from the legal database. For instance, if a citation is not retrieved in block 902 (as indicated by a determination in block 904), the citation is highlighted in block 906 to reflect that no corresponding document was found on the legal authority database. The system notes that an attempt to retrieve the citation was made and was unsuccessful. The user can click on the citation in the text or the tray and the system will launch a modal (e.g., "Add Document") in block 912 to manually upload the corresponding document in block 914. Once uploaded, the document will be added to the Master File or Research Library in block 916.

From block 916, processing proceeds to block 918 where each entry in the Legal Authority tray is checked against the documents in the Master File or Research Library tab. If the citation in the Legal Authority tray matches the citation for a document in the Master File or Research Library tab, processing proceeds to step 920 to check if there is more than one potential match. If there is only one match, processing proceeds to step 924 where the document in the Master File or Research Library tab is linked to the citation in the Legal Authority Tray and to the specific in-text citation. Processing stops at step 926 once all the entries in the Legal Authority Tray have been linked to documents in the Master File or Research Library tab.

However, if in step 920, the citation in the tray indicates several potential matches, processing continues to step 922 where a user interface is launched indicating all the potential matches and the user is prompted to select from the potential matches. The user selects the proper document by, for instance, selecting the higher level document as the match. Once the higher level document is selected, the user can decide whether to use this for all future references to that document or if the system should check at each potential conflict. If the user selected a document as the match in step 922, processing proceeds to step 924 where the selected document is linked to the citation in the Legal Authority Tray. Processing stops at step 926 once all the entries in the Legal Authority Tray have been linked to documents in the Master File or Research Library tab.

However, if there is no match between an entry in the Legal Authority tray and documents in the Master File tab in step 918, the citation is converted to a link and the system launches a modal (e.g., "Add Document" modal) in block 912 allowing the user to manually upload the corresponding document to the temporary storage in step 914. The manually uploaded document is added to Master File or Research Library tab in step 819. Processing proceeds as discussed above until all the citations in the Legal Authority tray have been processed.

Also, if a legal authority was not pulled from the legal database in block 902 because the citation was incorrect when added to the tray (e.g., due to poor OCR), the user can edit the citation in the tray to correct it. The system will retrieve the document with the corrected citation from the database of legal authorities. If the document with the original, incorrect citation was added to the system, it will be deleted and replaced by the document retrieved with the correct citation.

For citations that were not originally identified in the document (e.g., due to OCR issues), the user can manually select the citation in the document and click on "add citation" to add it to the tray. The user can edit the entry in the tray to reflect the accurate citation (if necessary). The system will retrieve the correct document from the legal authority database and upload it automatically, or the user can manually upload the document or link the cite to a document already in the Matter.

After all the cited documents are linked, one or more embodiments of the invention provides for generating the linked document ("e-Brief") for production. In one or more embodiments, the document is converted into a PDF consisting of the main document (e.g., a brief) with each citation converted to an active hyperlink (which links to the document corresponding to the citation later in the PDF) and followed by each of the documents cited in the main document.

Document Management & Analysis

One or more embodiments of the present invention provide an evidence component that enables users to build a powerful and interactive chronology, which contains entries for key items, such as documents and events. This is accomplished by tying every entry to an item, such as a document, and its associated metadata. Also, any discussion or comment about the item is tied to it and can be easily accessed from the entry. The invention also provides graphical timeline representation of the items in the chronology and various tools to manipulate the timeline.

Users can upload or link to data sets and overlay the data on the items in the chronology. For example, in a securities litigation involving a particular stock, a user can overlay the stock price on the documents in the chronology. Each document will be tied to the stock price on that day. A graphical representation will show the user how the price for that day compares with the stock price before and after.

Embodiments of present invention also include a social media management tool that allows users to meaningfully organize, link and analyze social media. For example, using location data tied to social media items, users will be able to depict the chronology of events and documents over time and space.

In one or more embodiments of the present invention, items in the system can be viewed in a table. The table has a set width. The columns have two organizational components: The first component is a set of fixed columns with attributes that can be used to identify the item in the row. For example, for a document, these can be the date, the document type, and the document subject or title. The second component consists of several sets of columns of related attributes. The user can choose which set of column to display in this second component. As the user swaps one set of columns for another, the first component stays anchored. This allows the user to always know exactly which item is represented by a particular row. In one or more embodiments of the invention, the user will have tabs, buttons, or links representing each set of columns. When the user clicks on a particular tab, button, or link, the columns related to that tab are swapped in for the second component.

Players

A Player is a person or entity that is relevant to a particular matter. For example, a Player may be a party, a witness, a custodian of documents, etc. The Players List feature of the present invention enables the team to manage information and intelligence about the people and entities (i.e., Players) that are relevant to the Matter.

Every Player has an individual profile that is automatically linked to every item associated with the Player. For example, an item in Evidence related to the Player, either in the metadata or in the text, is linked to the Player. The present invention will also link portions of documents in the Master File that mention the Player by name or alias. For example, if certain discovery responses or deposition transcripts mention the Player, those items will be associated with the Player. The Player profile links to the items related to the Player.

With the Players List, users can conduct analyses and generate Reports related to one or more Players and their related items. Players and their relationships with other issues and Players may be depicted visually to aid in the analyses. For example, with embodiments of the present invention it is possible to create visual representations that depict a Player and their interactions with other Players. Users can analyze these interactions based on occurrences, timing, issues, and other elements.

Authentication

A user can access a listing of the documents that any Player can authenticate and has authenticated, can generate a Report with the documents that a Player can authenticate or with the documents the Player has authenticated along with the corresponding deposition excerpts authenticating the document.

Users can track whether a document in evidence has been authenticated by a Player. Every document added to Evidence in the present invention has several metadata fields related to authentication, including whether or not the document has been authenticated, which Players can authenticate the document, which Player or Players have authenticated the document (if the document has been authenticated), the method of authentication, and an excerpt from the transcript of the Player authenticating the document.

Discovery Tools

In one or more embodiments of the present invention, if the Master File document is written discovery, a tool specific to managing, linking and analyzing written discovery can be launched. For example, the tool provides for unitizing, capturing and linking individual requests and responses in written discovery. As units, these requests and responses can be annotated and tagged, as well as linked to other documents, such as motions to compel. Users can also generate reports separating the requests and responses along with any annotations and tags. The system will automatically unitize written discovery requests and responses, and link individual requests to corresponding responses, as well as amended and supplemental responses.

The system also includes a production tracker for tracking productions of documents in discovery. The production tracker contains entries for each production and clawback made in the matter. Each entry may include fields of data, such as date of the production, party making the production, production volume, etc. Documents, such as cover letters, can be associated with the relevant entry. Evidence documents with Bates numbers are automatically checked against the production tracker and tied to the appropriate entry with the production containing the document. Users can also add privilege and redaction log entries to the chronology as items. Redaction log entries can be automatically tied to documents in the chronology.

Video and Transcript Management

One or more embodiments of the present invention also include tools to manage and link transcripts and videos. For example, users can highlight, tag or annotate portions of the transcript and these selected portions will be tied to the corresponding part of the video. Users are able to generate interactive reports that show the selected portion of the transcript along with the corresponding snippet of the video. Users are also able to link exhibits to the portions of the transcripts where the exhibit is discussed. The document will then be tied to that portion of the transcript. Users can generate presentation slides (e.g., PowerPoint) with tear outs for the selected text and add the corresponding snippet of the deposition video.

Text Message Management

One or more embodiments of the present invention provide for management of text messages. In a typical litigation, raw texts are produced in a load file, where each text is a separate database entry with a corresponding TIFF, or extracted to an Excel spreadsheet with each row corresponding to a text. In a preferred embodiment, the raw texts are automatically converted to a table where each row represents a single text. The table includes one column for the number sending the text and one column for the number receiving the text. If this number has been associated with a Player in the case, the cell is populated with the Player's name instead of the number. The table will also have the date and time the text was sent, and the content of the text.

The user can then select the rows (texts) that make up a conversation to form an "exchange." Once rows are combined into an exchange, the rows gray out to indicate inclusion into an existing exchange. Those of skill in the art would appreciate that it may be desirable to prevent the grayed out rows from being selected and used to form separate exchanges. The user can also choose to hide or show rows that have already been incorporated into an exchange. If the user later finds another text that belongs in an exchange, the text can be dragged into the exchange to add it. The user can also filter the table to only show texts exchanged between two numbers. The system can automatically deduplicate texts between the same numbers or identify potential duplicate texts for merging. The system may also automatically merge identical texts sent to different people. For example, if one person sends a text to five people, it will be reflected as five different raw texts. Embodiments of the invention will merge these into one entry with one sender and five recipients.

Exchanges can be added to the chronology in the Evidence tab. An exchange has its own card or entry displaying the exchange. An exchange can be tagged, annotated, searched and filtered as with any other document on the system. The entry tracks the Bates number(s), confidentiality designation(s), and any other specific information associated with the texts in the exchange.

Feed

In one or more embodiments, collaboration on an item may start by a user creating a post and adding the item (e.g., a document) to the Feed. Prior to posting, the user may choose where to direct the item (e.g., Evidence, Master File, Research Library) or the system will use the results of the OCR to determine the location. Thus, for instance, if it identifies a Bates number, it will send the document to Evidence; if it identifies a caption page or a footer of a litigation document, it will send the document to the Master File; and if it identifies an opinion, it will send the document to the Research Library. The user can also choose to add metadata to the item at this stage. The user may then post the item to the Feed with or without a comment. The system then automatically adds the item to the selected location (i.e., Evidence, Master File, or Research Library) and if any metadata was entered, it is associated with the document. Also, if a comment was included with the post, it is added as a conversation to the document.

Users can use the Feed to post items to the team. Users can post items like comments, documents, files, events, deadlines, and tasks. Users can interact, discuss, highlight, search, and archive items in the Feed.

Highlighting a post sets the post apart from the other items in the Feed. Other users with access to the post can see that it has been highlighted. Feed items that have been highlighted may float or rise to the top of the Feed or to a separate area of the screen. Users are then prompted to address the item before sending it back into the feed. Users can also filter the Feed to show only highlighted posts.

In one or more embodiments of the present invention, items posted to the Feed are automatically sent to the appropriate bucket along with any associated metadata and work product. For example, if a user posts an evidentiary document to the Feed, it is automatically added to the Evidence tab with all associated metadata.

Posts can be directed to preset and custom distributions, or to specific users, such that only users that are part of the selected distribution or specifically addressed can view and interact with the posts.

A docket tracking feature synchs a Matter to its electronic docket (e.g., PACER). Users can get updates directly to the Feed when a document has been filed with the court or served on the other side. These documents will automatically be shared with the users on the Matter when filed and added to the appropriate location along with available metadata.

Discussion and Messaging

Users can share documents and discussions from the present invention, and message or chat with other users. Users can drag any item in the present invention into another window to create a link to the item. This link can be sent as a chat or direct message in the present invention, or in any other program, such as email. It can also be embedded into any document that can capture text (e.g., dragging the item into a Word document). Users can drag items to other locations in the present invention to share them (e.g., chat windows, comment boxes).

Users can chat with one or more other users in real time on any device. A user can drag any item in the present invention into the chat window, and the present invention will convert it to a link to that item. The user can then send that link to the person she is chatting with who will now be able to navigate to the item represented by the link. Also, the user can send a link to the view she is looking at. The person on the other end of the chat can then quickly get on the same page and view the exact same thing. A person that is online can be pinged, if it is desired to enter into a chat with that person. The person will be notified along with a link that would launch them into a chat with the pinging user.

Calendar

The Calendar enables the team to manage events, deadlines and tasks. Users can assign metadata to Calendar entries and one or more embodiments of the present invention will create and link related entries based on the metadata. For example, if a user adds an entry for a motion, the Calendar will automatically create later and linked entries for the briefing schedule and hearing. Similarly, if the user creates an entry for a deposition, the deadline by which the deposition transcript must be reviewed is created. Users can also link to entries manually.

Users can link entries in the Calendar to other items (e.g., Evidence, Master File, Research Library), as well as other Calendar entries. This includes individual items, like documents, or collections of items, like work files. The Calendar entry features a link to the related document. For example, a user can link an entry for a meeting with a work file containing the documents relevant to the meeting. Users invited to the meeting can access the work file through the link associated with the Calendar entry.

As discussed above, the Calendar synchs up with the Master File. Items added to the Master File and expected response dates or events are reflected in the Calendar. Similarly, when a user creates an event in the Calendar, a corresponding entry may be created in the Master File.

The Calendar also has tools to manage workflow related to a particular task or assignment. Users can set multiple tiers of activity for a particular task. Using this workflow, each subsequent user can review or work off of what the prior user did. For example, a junior associate is assigned the task of creating the initial draft, the senior associate is assigned the task of revising it, the partner is tasked with a final review, and then finally the client receives the final version. Once a user indicates that her stage of the workflow is complete, the next user in line receives a notification to initiate their part of the task, along with a link to the relevant item (e.g., the latest draft). Users can also isolate unassigned deadlines and tasks and view how tasks have been allocated across the team to assist in managing workload for a matter.

The Calendar also provides capability to perform group evaluation. The group evaluation feature allows for an item to be evaluated by multiple people without them seeing what the others concluded. For example, a user can send work product to the select members and invite them to provide their evaluation. Only the user requesting the evaluation has access to the invitees' comments, edits or suggestions. The requester can subsequently choose to reveal the evaluations to the team. A user can also seek a blind evaluation, where the people submitting the evaluations are made anonymously and the requester cannot see their identities.

Through the Calendar, users can invite vendors to attend or compete for a particular event. For example, for a scheduled deposition, a user can invite a vendor to provide court reporting and videographer services. The vendor can confirm their attendance and provide pricing information or an invoice. A user can access the vendor information from a shared contacts directory or from a broader, public directory. The user can also invite multiple vendors to ensure availability or compare pricing, and ultimately choose and schedule one to attend.

Print to Cloud

Print to Cloud allows a user to send a document, along with metadata, from any application to any Matter in the database, and automatically store the document in the appropriate location (e.g., Evidence, Master File, and Research Library). The user can also choose to share the document with a particular feed distribution—with or without a comment; enter metadata related to the document (e.g., date, document type, associated players, subject, description); and apply tags to the document.

The mechanism is the Print to Cloud print driver that the user can install. Once installed, the Print to Cloud print driver will be available as a printer option accessible from any application. From the initial print dialog, the user is given standard print options and settings (e.g., setting the page range to print, orientation, etc.). The user can also (a) choose what Matter to send the document to, (b) choose the location to add it to (e.g., Evidence, Master File, Research Library), (c) choose to share the document with the Feed (and add a comment), and (d) enter in some basic data for the document, including: Date, Document Type, Player Names (To, From, CC, Author), Subject, Description, Tags. The user then selects send in the dialog box to "print" the document to the desired location.

The print instruction causes the document to be added to the Matter and location specified by the user, the metadata entered and tags applied are associated with the document (e.g., a document card is created for the document as if you added the document directly from the system), and if the user chose to post the document to the Feed, the document is posted to the Feed, available to the selected distribution, along with the user's comments.

Confidentiality Designations

One or more embodiments of the present invention provide access for users to set confidentiality designations that correspond to particular user classes (e.g., in compliance with a Protective Order in litigation). These designations can then be applied to documents or document portions, either manually or automatically. Users can only access documents or document portions with designations that are accessible to their user class (e.g., documents designated as "outside counsel's eyes only" cannot be seen by client users).

Auto-Population

In one or more embodiments of the present invention, one or more of a document's metadata fields are automatically populated once the document is loaded into the system of the present invention. The document may be a Master File document, an evidentiary document, etc. The caption page is the first page of the typical Master File document. This includes documents that are filed with the court—like pleadings, motions and applications—and documents that are served on parties—like interrogatories, requests for production, and requests for admission. The table below and FIGS. 10A-D provides the typical types of information found on a typical caption page and the metadata fields wherein these items could be mapped. One or more of the fields could also be mapped to the Matter Profile, preferably the first time the operative pleading (e.g., complaint) is uploaded or the Case Directory.

| Information Item | Description | Example Mapping |
| --- | --- | --- |
| Title of the Document (e.g., 1008) | The full title of the document. For example, "Motion for Summary Judgment" or "Plaintiff's First Set of Requests for Production." | MF - Full Title/Caption field |
| Footer (e.g., 1012) | Typically contains an abbreviated title for the document | MF - Short Title field |
| Attorney & Firm Info (e.g., 1002) | The name(s) of the attorney(s) and firm(s) or entities (e.g., US government) representing the party filing or serving the document, including the contact information and state bar numbers for the attorney(s). Some jurisdictions require this info in the signature page and do not include it on the caption page. | MF - Players |
| Party Info (e.g., 1004) | The party's name and type (e.g., plaintiff, defendant, cross-complainant) is typically found under the attorney/firm info block in the form "Attorneys for [Party Type] [Party Name]." | MF - Party field |
| Court Information (e.g., 1006) | The name and location of the court, as well as info about the judge. From this you can determine if the case is in federal or state court. | |
| Title of the Case (e.g., 1005) | This is where you list the parties on either side of the "v." - plaintiff(s) first and then defendant(s) on the other side of the "v." The caption page lists every party in the action, assuming there are multiple parties. | |

| Information Item | Description | Example Mapping |
| --- | --- | --- |
| Case Number (e.g., 1007) | The number the court uses to identify the case in its docket. | |
| Hearing Information (e.g., 1010) | When the document relates to a hearing, such as a motion, opposition, or reply, you typically include the date, time and place of the hearing. | MF - placeholder for hearing Calendar - entry for hearing as event |
| Document Number (e.g., 1014) | The number the firm uses internally to identify the document on its document management system (DMS) | MF - Document Number field |

Figure 10A:
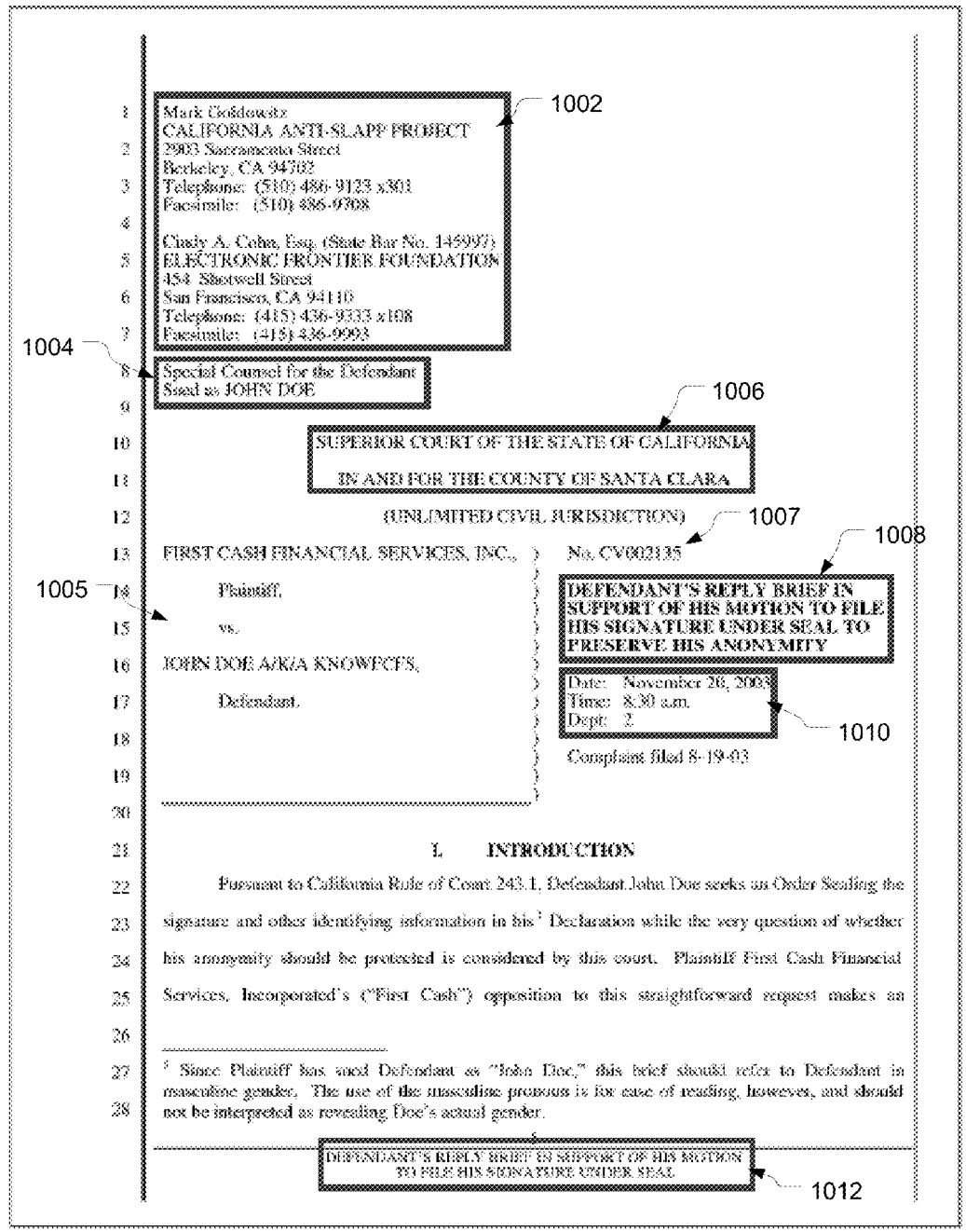
Figure 10B:
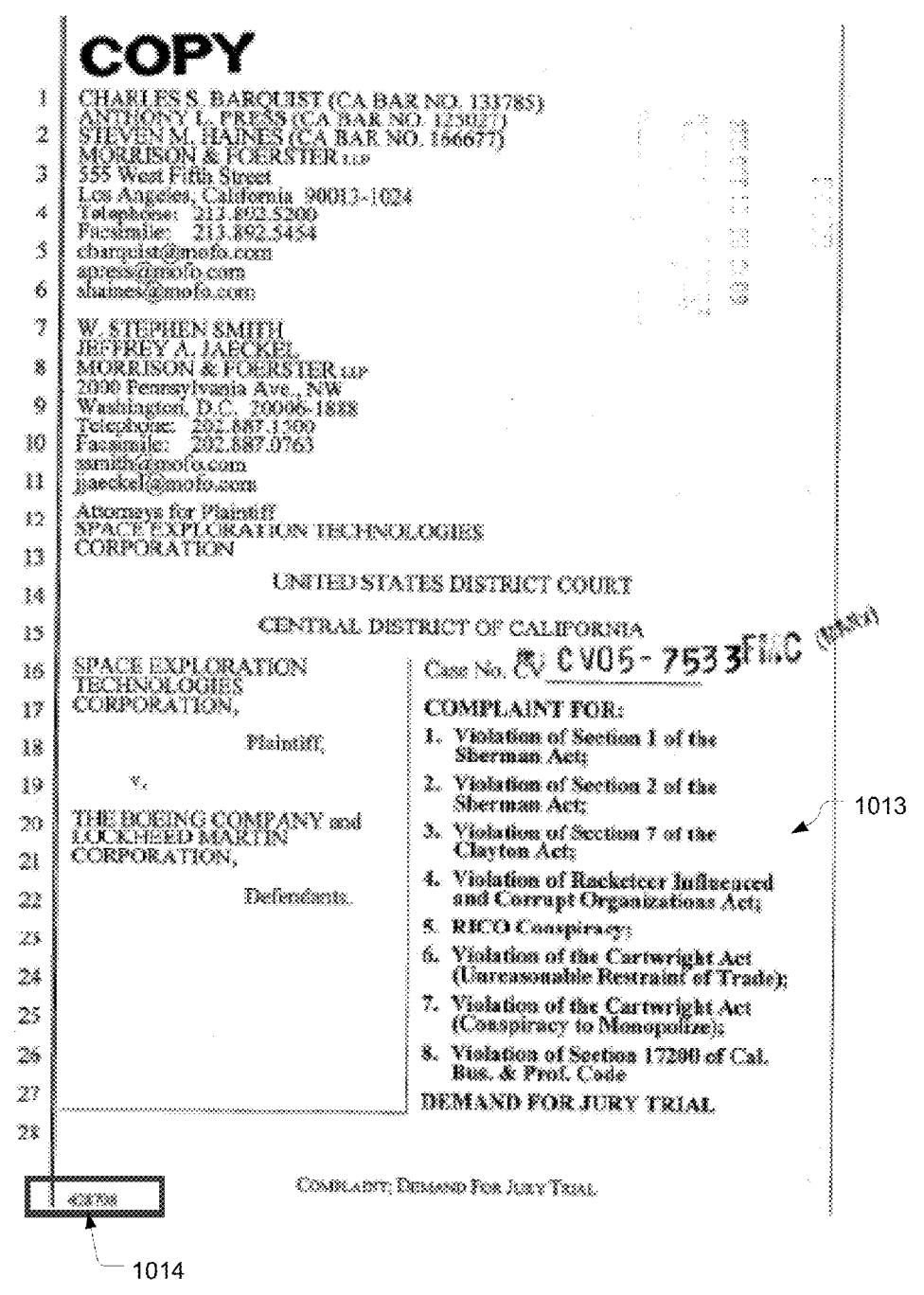
Figure 10D:

Obtaining metadata field information from a document is based on certain known and presumed attributes for the type of document. For instance, as illustrated in FIG. 10A the Full Title of the Document 1008 is usually located on the caption page, highly likely to be in ALL CAPS (in the rare cases where the caption is not entirely in ALL CAPS, it will be a mixture of ALL CAPS and sentence case (e.g., as illustrated in FIG. 10B, 1013)), likely to be bolded, and most likely to be a continuous sentence, paragraph, or block of text on the caption page. However, in some documents such as complaints, the causes of action are broken out in a numbered list (e.g., as illustrated in FIG. 10B).

Also, the signature page can be identified and potential metadata information extracted therefrom. The signature page is typically the last page in a Master File document, but not always. As illustrated in FIG. 10C, the signature page can be identified when, for instance, a page other than the caption page contains the phrase "Attorney for" or "Attorneys for", the page contains the phrase "Respectfully submitted", the page contains the phrase "Dated:" (e.g., 1016), contains an actual signature or an "/s/" in the signature line, or combinations thereof.

In one or more embodiments, acquiring the data for auto-population depends on the field being populated. For instance, the Full Title field may be populated based on results from a keyword search. The System searches the caption page for the first instance of any of the appropriate keywords (e.g., Complaint, Answer, Stipulation, Notice, Motion, Request, Reply, etc.) and it locates a keyword. Everything in the sentence or paragraph containing that keyword is considered the full title, e.g., 1008 and 1013. In cases, where there are multiple instances of these keywords on the page, the system identifies the caption as the instance closest to the top of the page. The system then populates the Full Title field with the entire full title from the caption page.

Populating the Short Title Field is based on the caption page footer. This may be accomplished, for instance, by locating and capturing the caption page footer, and populating the Short Title field with the captured string.

Populating the Party Field may be based on keywords. For instance, the system searches the caption page, FIG. 10A, and signature page, FIG. 10C, for the phrase containing the following keywords "Attorney for . . . [Party Type] [Party Name]" or "Attorneys for . . . [Party Type] [Party Name]." The system parses the phrase to isolate the Party Name and Party Type and populates the Party Field with the Party corresponding to that Party Type (as reflected in the Matter Profile). Special rules may be followed in cases where there are multiple parties. For instance, if there are multiple parties of that Party Type (e.g., multiple defendants), the system locates the Party Name in the phrase and compares identified Party Names with the party names in the Matter Profile for that party type.

The Party Field may also be populated based on the Full Title field. For instance, the system checks the party names listed in the Matter Profile against the Full Title field and captures the first instance of a party name. For example: assuming a Full Title such as "DEFENDANT MICROTECH'S OPPOSITION TO PLAINTIFF INNOTECH'S MOTION FOR SUMMARY JUDGMENT ON CLAIM NUMBER FIVE FOR FRAUD," here, the Full Title contains two party names: Microtech and Innotech. The system assumes the document belongs to the first party mentioned. In another example, assuming a Full Title such as "DEFENDANT'S OPPOSITION TO PLAINTIFF'S MOTION FOR SUMMARY JUDGMENT ON CLAIM NUMBER FIVE FOR FRAUD," this example does not have the Party Name, but does have the Party Type. If there is only one party of that type, the system uses the Party Type to determine the Party Name populates the Party field based on the first instance of the party type.

Populating the Date Field may be accomplished using the stamp from the filing service. For instance, in federal court, litigants use a system known as ECF to electronically file documents with the court and automatically serve them on the other parties. Any document filed through ECF system is stamped with a PACER filing stamp, e.g., 1018 in FIG. 10D, and is available for download by the public for a price through a system called PACER. In these instances, the system may find the Date field by locating the PACER/ECF filing stamp at the top of the first page. Note that the stamp actually appears on every page in blue with its own page count. The system then extracts the date after the term "Filed" and uses that to populate the Date field for the document.

For all other documents, the system may locate the date of the document from the signature page, e.g., 1016, extract and populate the Date field with the information.

Populating the Document Type field may be based on the Full Title field, irrespective of whether it is manually inputted or captured based on the auto-population rules discussed above. For instance, once the full title is identified, the system looks within the title for the first instance of one of the recognized document types. For Example: COMPLAINT FOR FRAUD, NEGLIGENT MISREPRESENTATION, AND VIOLATIONS OF SECTION 349 AND 350 OF NEW YORK GENERAL BUSINESS LAW. Here, "COMPLAINT" is the first (and only) instance of a document type in the full title, so it becomes the document type. In some other cases, there is a second instance of a document type within the Full Title. This is usually used to indicate a relationship between two documents. For Example: DEFENDANT MICROTECH'S OPPOSITION TO PLAINTIFF INNOTECH'S MOTION FOR SUMMARY JUDGMENT ON CLAIM NUMBER FIVE FOR FRAUD. Here, there are two document types in the full title: "OPPOSITION" and "MOTION FOR SUMMARY JUDGMENT." The document type is captured by the first instance, e.g., "Opposition." The above rules are exemplary only and are not intended to be exhaustive.

Other fields of the Master File document may be extracted and the metadata field populated, for instance, the Document Number field may be populated from information available from block 1014 by scanning lower left hand corner of any page in the document for string of numbers (e.g., in a smaller font than the rest of the text on the page). If found, the string is captured and added to Document Number field.

Metadata field for evidentiary documents may also be auto-populated in one or more embodiments of the present invention. Obtaining the metadata field information from an evidence document may be based on certain known and presumed attributes for the type of document as illustrated in FIG. 11.

Figure 11:
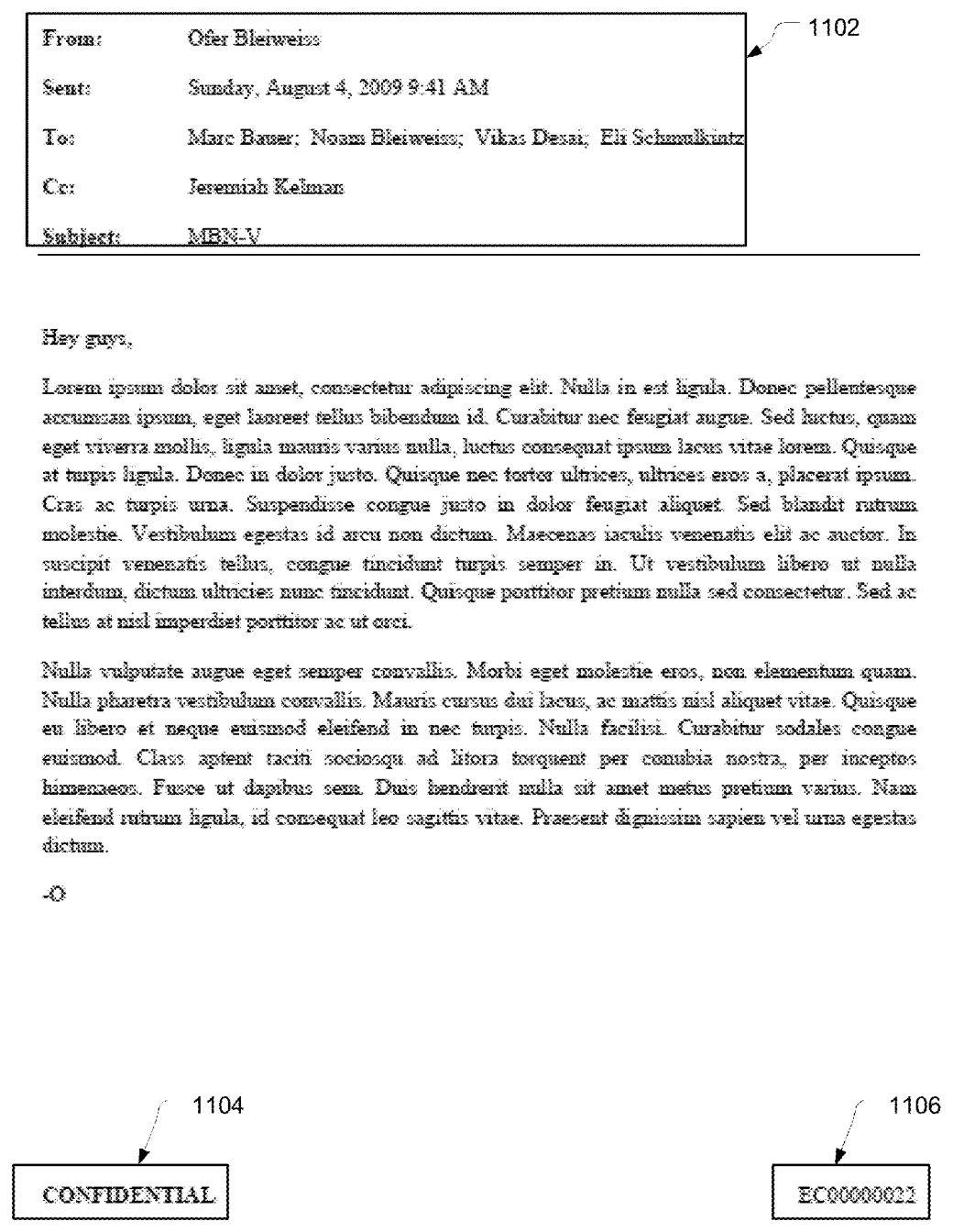

FIG. 11 is an illustration of parsing a typical evidence production page in accordance with one or more embodiments of the present invention. As illustrated, typically each page that is produced in a litigation is branded with a unique identifier known as the Bates number. The branding consists of a prefix that identifies the party producing the document and a number that represents where the page is in that party's production. In a large litigation, the number will typically have a large number of digits, e.g., 7-8. All pages produced by a single party are numbered consecutively across documents. For example suppose a party (prefix GTL) produces a four page document and a five page document. Example Bates ranges for the two documents could be GTL000001 to GTL000004 for the first document and GTL000005 to GTL000009 for the second document. In most cases the Bates number will be in the footer of the document and in the bottom right corner, e.g., 1106. It could also be centered or on the left corner (rarely). The Format is usually [Bates Prefix][Bates Number]. The prefix is used to identify the party that produced the document. It is unique to that party. Typically, the prefix corresponding to each party in the case has already been entered in the Matter Profile so that this information can be used to further identify the Bates information.

The Bates range is represented by the Bates number on the first page as the start of the range (usually captured in the PRODBEG field in e-discovery databases) and the last page as the end of the range (the PRODEND field).

In one or more embodiments, when the Bates Prefix is identified, Bates prefix field is populated with the identified prefix, the beginning Bates field is populated with the Bates number on that page and based on number of pages, the end Bates Range number field is populated. The system can also retrieve the end Bates number from the last page of the document.

In one or more embodiments the Confidentiality field may also be auto-populated. For instance, in cases involving sensitive information, the court will typically enter what's known as a Protective Order. The Protective Order lays out different confidentiality designations that can be applied to documents or information in the case which correspond to different access levels. Typical designations include CONFIDENTIAL, ATTORNEY'S EYES ONLY, OUTSIDE COUNSEL'S EYES ONLY.

To identify and populate the Confidentiality field, the system scans the footer (e.g., bottom inch) of the first page of the document for Confidentiality designation, e.g., 1104, checks the designations in the Matter Profile against the designation on the page and if there is a match, populates the Confidentiality field with the identified Confidentiality designation.

In one or more embodiments the email header fields may also be auto-populated. For emails uploaded to the Chronology without any metadata, certain fields may be populated based on the top level email with data provided in block 1102. For instance, the Header fields include the From/To/Cc/Bcc which can be converted to the corresponding Players for these Player fields for the email document. The "Subject" can be used to populate the Subject/Title field with the string after "Subject:" or "Re:" and the Date and Time may be used to populate the date and time fields based on the corresponding fields in the email.

While the invention herein disclosed has been described by means of specific embodiments and applications thereof, numerous modifications and variations could be made thereto by those skilled in the art without departing from the scope of the invention set forth in the claims.

What is claimed is:

1. A method for collaborative matter management and analysis comprising:
   uploading a new document to a Master File in a computer system for collaborative matter management and analysis, wherein the Master File is a document repository for a matter;
   creating one or more metadata fields for said new document;
   extracting text from said document using text recognition;
   populating the one or more metadata fields with Players, document type and date associated with said new document;
   using said document type to determine if there are related documents and generating a structural hierarchy and placeholders for said related documents, wherein the structural hierarchy is based on timing;
   determining from said extracted text if said new document is an evidentiary document and adding a plurality of authentication metadata fields to said one or more metadata fields for authentication if said new document is evidentiary;
   determining from said extracted text if said new document is a version of an existing document in the system and associating said new document with said existing document upon positive determination;
   identifying all citations to evidentiary documents, Master File documents and legal authority documents in the new document; and
   converting said citations in said new document to hyperlinks to other documents in the system.

2. The method of claim 1, wherein said uploading said new document comprises dragging said new document into a modal for said Master File launched in response to a user request.

3. The method of claim 1, wherein said document type is a court motion and said structural hierarchy comprises an Opening Brief, a Reply Brief, an Opposition Brief, and an Order.

4. The method of claim 1, wherein said text recognition is by optical text recognition (OCR).

5. The method of claim 4, wherein said plurality of authentication metadata fields includes whether or not the new document has been authenticated, which of said Players can authenticate the new document, which one of said Players have authenticated the new document, a method of authentication, and an excerpt from a transcript of the Player authenticating the new document.

6. The method of claim 1, wherein said extracted text is stored in one of said one or more metadata fields of said new document.

7. The method of claim 6, wherein said determining from said extracted text if said new document is a version of an existing document comprises comparing said new document's extracted text with each existing document's extracted text stored in the existing document's metadata fields.

8. The method of claim 1, wherein said one or more metadata fields comprises:
  an OCR field for storing said extracted text;
  an Evidence Tray for storing the citations to evidentiary documents;
  a Master File Tray for storing the citations to Master File documents; and
  a Legal Authority Tray for storing the citations to legal authority documents.

9. The method of claim 8, wherein said converting said citations in said new document to hyperlinks to other documents comprises:
  scanning said extracted text for evidentiary citations;
  placing each unique evidence citation found in said new document as an entry in said Evidence Tray;
  determining an evidentiary document in an Evidence tab corresponding to each one of said entries in said Evidence Tray, wherein said evidence tab comprises one or more evidentiary documents, and
  linking each of said evidentiary document to said corresponding evidence citation in said new document.

10. The method of claim 8, wherein said converting said citations in said new document to hyperlinks to other documents comprises:
  scanning said extracted text for Master File document citations;
  placing each unique Master File citation found in said new document as an entry in said Master File Tray;
  determining a Master File document in a Master File tab corresponding to each one of said entries in said Master File Tray, wherein said Master File tab comprises one or more Master File documents; and
  linking each of said Master File document to said corresponding Master File citation in said new document.

11. The method of claim 8, wherein said converting said citations in said new document to hyperlinks to other documents comprises:
  scanning said extracted text for legal authority citations;
  placing each unique legal authority citation found in said new document as an entry in said Legal Authority Tray;
  obtaining one legal authority document corresponding to each one of said entries in said Legal Authority Tray; and
  linking each of said legal authority document to said corresponding legal authority citation in said new document.

12. The method of claim 1, further comprising:
  posting said new document to a feed; and
  capturing collaborative discussions about said new document in said feed.

13. A system for collaborative matter management and analysis comprising:
  a computer system with memory comprising a stored set of instructions for collaborative matter management and analysis;
  an interface to a user for uploading a document;
  an interface to said user for updating one or more metadata fields of said document; and
  at least one processor configured to process the stored set of instructions, the stored set of instructions configured to:
  receive a new document to upload to a Master File, wherein the Master File is a document repository for a matter;
  create one or more metadata fields for said new document;
  extract text from said new document using text recognition and saving said extracted text in one of said one or more metadata fields of said new document;
  auto-populate said one or more metadata fields with Players, document type and date associated with said new document;
  determine from said extracted text if said new document is an evidentiary document and adding a plurality of authentication metadata fields to said one or more metadata fields for authentication if said document is evidentiary;
  use said document, type to determine if there are related documents and automatically generate a structural hierarchy comprising a cluster of documents for said new document, wherein the structural hierarchy is based on timing, and reserving placeholders for the other related documents in said cluster;
  determine from said extracted text if said new document is a version of an existing document and associating said new document with said existing document upon positive determination;
  identify all citations to evidentiary documents, Master File documents and legal authority documents in the new document; and
  convert said citations in said new document to hyperlinks to other documents in the system.

14. The system of claim 13, wherein said plurality of authentication metadata fields includes whether or not the new document has been authenticated, which of said Players can authenticate the new document, which one of said Players have authenticated the new document, a method of authentication, and an excerpt from a transcript of the Player authenticating the new document.

15. The system of claim 14, wherein said one or more metadata fields comprises:
  an OCR field for storing said extracted text;
  an Evidence Tray for storing citations to evidentiary documents;
  a Master File Tray for storing citations to Master File documents; and
  a Legal Authority Tray for storing citations to legal authority documents.

16. The system of claim 15, wherein said convert citations in said new document to hyperlinks to other documents comprises:
  scanning said extracted text for evidentiary citations;
  placing each unique evidence citation found in said new document as an entry in said Evidence Tray;
  determining an evidentiary document in an Evidence tab that corresponds to each one of said entries in said Evidence Tray, wherein said evidence tab comprises one or more evidentiary documents; and
  linking each of said evidentiary document to said corresponding evidence citation in said new document.

17. The system of claim 15, wherein said convert citations in said new document to hyperlinks to other documents comprises:
  scanning said extracted text for Master File citations;
  placing each unique Master File citation found in said new document as an entry in said Master File Tray;
  determining a Master File document in a Master File tab that corresponds to one of the entries in said Master File Tray, wherein said Master File tab comprises one or more documents; and
  linking each of said Master File document to said corresponding Master File citation in said new document.

18. The system of claim 15, wherein said convert citations in said new document to hyperlinks to other documents comprises software tool to:
- scanning said extracted text for legal authority citations;
- placing each unique legal authority citation found in said new document as an entry in said Legal Authority Tray;
- obtaining one legal authority document corresponding to each of said entries in said Legal Authority Tray; and
- linking each of said legal authority document to said corresponding legal authority citation in said new document.

19. The system of claim 15, wherein said convert citations in said document to hyperlinks to other documents comprises software tool to:
- scanning said extracted text for citations;
- placing each unique evidence citation found in said new document as an entry in said Evidence Tray;
- placing each unique Master File citation found in said new document as an entry in said Master File Tray;
- placing each unique legal authority citation found in said new document as an entry in said Legal Authority Tray;
- obtaining a cited document for each of said entries in said Evidence Tray, said Master File Tray, and said Legal Authority Tray; and
- linking each of said cited document to a corresponding one of said citation in said new document.

20. The system of claim 13, wherein the stored set of instructions is further configured to:
- provide an interface for posting said new document to a feed; and
- capture collaborative discussions about said new document in said feed.

* * * * *